(12) United States Patent
Nicholas et al.

(10) Patent No.: US 12,028,401 B2
(45) Date of Patent: Jul. 2, 2024

(54) METHOD AND SYSTEM FOR THE CREATING, MANAGING, AND DELIVERY OF FEED FORMATTED CONTENT

(71) Applicant: Dizpersion Corporation, Evanston, IL (US)

(72) Inventors: Frank C. Nicholas, Glenview, IL (US); Ian B. Carswell, Chicago, IL (US)

(73) Assignee: Dizpersion Corporation, Evanston, IL (US)

( * ) Notice: Subject to any disclaimer, the term of this patent is extended or adjusted under 35 U.S.C. 154(b) by 318 days.

(21) Appl. No.: 16/575,064

(22) Filed: Sep. 18, 2019

(65) Prior Publication Data

US 2020/0014744 A1    Jan. 9, 2020

Related U.S. Application Data

(62) Division of application No. 11/465,735, filed on Aug. 18, 2006, now abandoned.

(60) Provisional application No. 60/737,214, filed on Nov. 16, 2005, provisional application No. 60/710,030, filed on Aug. 18, 2005.

(51) Int. Cl.
| | | |
|---|---|---|
| *G06F 16/00* | (2019.01) |
| *G06F 16/40* | (2019.01) |
| *G06F 16/60* | (2019.01) |
| *G06F 16/70* | (2019.01) |
| *H04L 67/02* | (2022.01) |
| *H04L 61/30* | (2022.01) |
| *H04L 67/55* | (2022.01) |

(52) U.S. Cl.
CPC ............ *H04L 67/02* (2013.01); *G06F 16/40* (2019.01); *G06F 16/60* (2019.01); *G06F 16/70* (2019.01); *H04L 29/12594* (2013.01); *H04L 61/30* (2013.01); *H04L 67/26* (2013.01)

(58) Field of Classification Search
None
See application file for complete search history.

(56) References Cited

U.S. PATENT DOCUMENTS

| | | | |
|---|---|---|---|
| 5,724,521 A | 3/1998 | Dedrick | |
| 5,848,396 A | 12/1998 | Gerace | |
| 2004/0003040 A1* | 1/2004 | Beavers | .................. H04N 7/15 709/204 |
| 2004/0107439 A1* | 6/2004 | Hassell | .............. H04N 21/4312 725/44 |

(Continued)

*Primary Examiner* — Bai D Vu

(74) *Attorney, Agent, or Firm* — McDonnell Boehnen Hulbert & Berghoff LLP

(57) ABSTRACT

Example embodiments relate to creating, managing, and delivering feed formatted content. One method includes receiving a multimedia playlist request including at least one multimedia location indicator, determining at least one multimedia file location based on the at least one multimedia location indicator, and providing a multimedia playlist including at least one of the determined multimedia file locations. A further method includes receiving a resize input, resizing a feed reader from a first display including a first number of feed items to a second display including a second number of feed items based on the resize input, the first number different from the second number, receiving a scroll request, determining a scroll number based on the second number, and scrolling based on the determination.

5 Claims, 19 Drawing Sheets

(56) References Cited

U.S. PATENT DOCUMENTS

2006/0248209 A1* 11/2006 Chiu .................. G06Q 30/02
709/231
2009/0055768 A1* 2/2009 Chaudhri ............. G06F 3/0485
715/784

* cited by examiner

```
101     <?xml version="1.0" encoding="utf-8"?>
        <rss version="2.0">
          <channel>
102         <title>Evanston Events - Sponsored by the Evanston Chamber</title>
103         <link>http://evchamber.publishersplus.com/</link>
104         <description>Evanston Events</description>
105         <lastBuildDate>Wed, 21 Jul 1004 14:04:03 GMT</lastBuildDate>
            <item>
              <title>July 14th, Executive Women's Forum</title>
              <link>http://evchamber.publishersplus.com/rss/chamber2.asp</link>
              <description>8:00-9:15am, Lower Level Conference Room.  Held at One Rotary
108           Center</description>
            </item>
107         <item>
              <title>Weekend Event - Evanston Ethnic Art Festival</title>
108           <link>http://evchamber.publishersplus.com/rss/ethnicarts.asp</link>
109           <description>July 17th and 18th from 8am-8pm.   Held at Dawes Park on Sheridan
              Road and Chuch Street</description>
            </item>
            <item>
              <title>July 14th, Home-Based Business Network</title>
              <link>http://evchamber.publishersplus.com/rss/chamber.asp</link>
              <description>John Martin of Total Selling Solutions presents "Break the Rules and
              Close More Sales" Are you finding your prospects are turning you into an "unpaid
              </description>
            </item>
            <item>
              <title>Whole Foods Wednesday Lunch Special</title>
              <link>http://evchamber.publishersplus.com/rss/wholefoods.asp</link>
              <description>Whole Foods Wednesday Lunch Special $5 for a fresh baked Whole
              Foods pizza. Call ahead and it will be ready when you get here: 847.733.1800
              </description>
            </item>
          </channel>
        </rss>
```

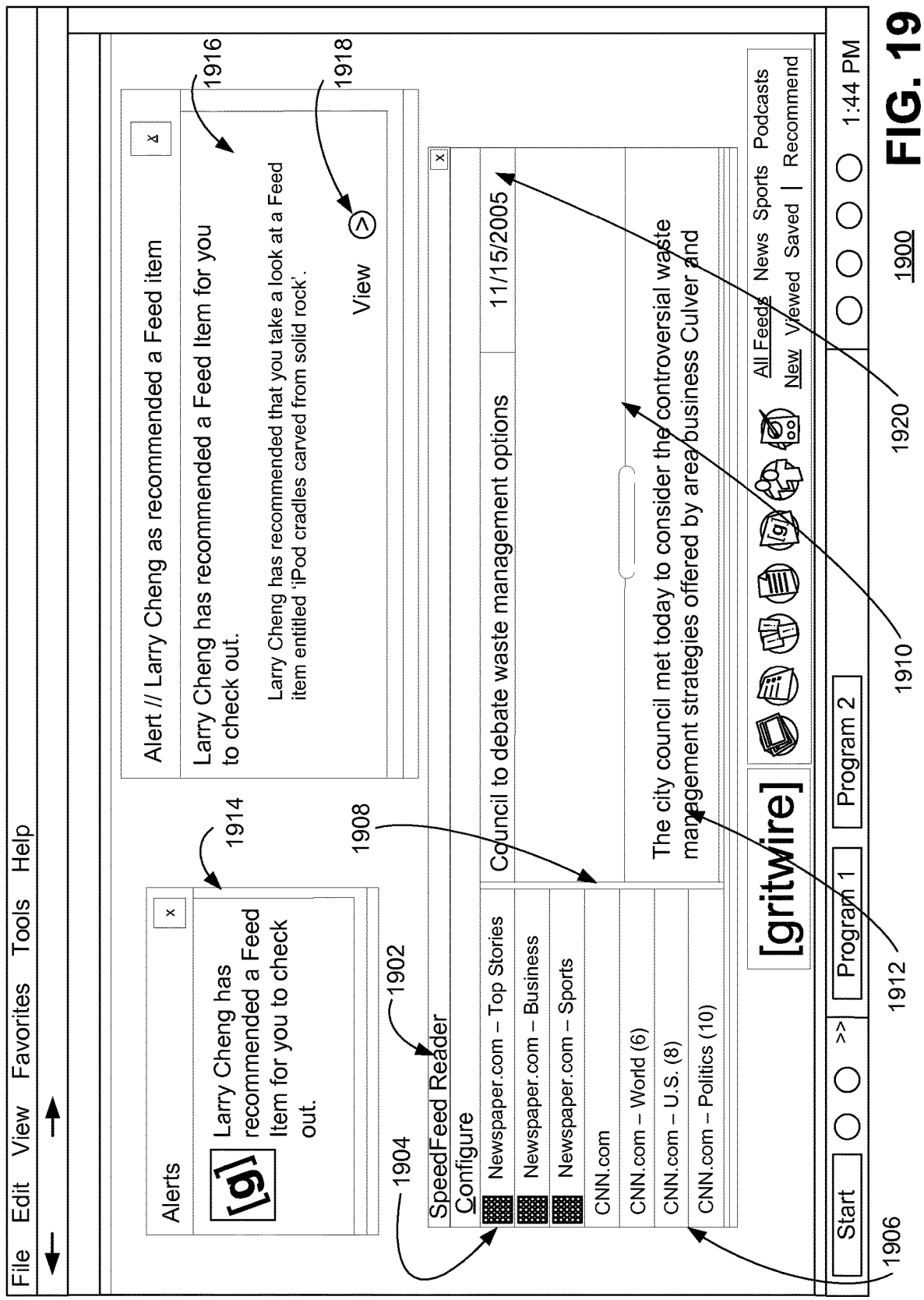

METHOD AND SYSTEM FOR THE CREATING, MANAGING, AND DELIVERY OF FEED FORMATTED CONTENT

RELATED APPLICATION DATA

This application is a divisional patent application of and claims the benefit of U.S. patent application Ser. No. 11/465,735, filed Aug. 18, 2006, which claims the benefit of U.S. Provisional Patent Application Ser. No. 60/737,214, filed Nov. 16, 2005, and U.S. Provisional Patent Application Ser. No. 60/710,030, filed Aug. 18, 2005, the Applications being incorporated by reference in their entirety herein.

FIELD OF THE INVENTION

The present invention generally relates to feed formatted content. More specifically, the present invention relates to the creation, management, display, tracking, and monetization of feed formatted content and social networking.

BACKGROUND OF THE INVENTION

The networked world, particularly the Internet and World Wide Web (WWW), has provided numerous communication formats. Two of the most ubiquitous include email and HTML web pages. Over the past several years, there has been an increased adoption and development of feed formatted content as a method of communication.

FIG. 1 shows representative feed formatted content 100. FIG. 1 is an example of XML, and specifically RSS, however it should be understood that other types of feed formatted content may contain like elements and be employed to accomplish like functions. Feed formatted content is structured data, such as for example Electronic Data Interchange (EDI), Extensible Markup Language (XML), or a subset of a general format such as RSS (Rich Site Summary or Really Simple Syndication), a hybrid or extension of some such standard, or the like. Feed formatted content 100 may be publicly or privately available and accessed through a feed, via a local or remote URL, stored in a local file, or the like. The term feed formatted content is a descriptor of both a whole and parts, in that it may describe an entire feed, a portion of a feed, a feed item, or a portion of a feed item. The term feed formatted content may also be used to describe content that was previously transferred in feed format. The term feed is location and the data returned when a request for feed formatted content is made.

Feed formatted content may include a feed header 101. In one embodiment, feed header 101 includes a header labeling feed formatted content 100 as XML data, and further provides two element wrappers: rss and channel. Feed header 101 may include a feed title 102 that names the feed, a feed link 103 that provides a Uniform Resource Identifier (URI) or Uniform Resource Locator (URL) to a resource that may be associated with the feed, a feed description 104 that may provide an explanation of the feed or feed contents. A feed header is not required in feed formatted content, and may contain less information than described, or may contain additional information such as standards used, format extensions, namespaces, or the like.

Feed formatted content 100 often represents multiple items, as is displayed in FIG. 1. Each feed item 106 may represent one or more news headlines, events, search results, items for sale or any other data. Feed item 106 may contain any number of elements. For example, it may include a title element 107, link element 108, and a description element 109. A feed item is not required in feed formatted content, and may contain less information than described, or may contain additional information such as content section wrapper 110, optional namespace elements 111 such as those in the xCal Document Type Definition (DTD), one or more enclosures 112 such as multimedia files, text documents, executable files, or the like. Terms have been adopted to describe feed formatted content with certain content. For example, a podcast is feed formatted content that includes an audio file as an enclosure 112, and a photoblog is a feed that includes images either in the description element 109 or as one or more enclosures 112.

Feed formatted content may be created for communicating between programs, computers or companies without the intention of display to an end user. Feed aggregation and display can be achieved in several ways. For example, aggregators may be stand alone desktop applications, plugins to existing applications such as Microsoft Outlook, or applications on a wireless device such as a cell phone or PDA. Desktop software solutions are commercially available, for example, under the names Pluck, and FeedDemon. Using such programs, feed requests are made directly from the desktop software from an end user's computer. A web-based approach, for example, is available at the website maintained under the commercial name Bloglines. This website maintains feed subscription information in a central user database and feed requests are made by a remote server and displayed on the Bloglines website.

One problem with current aggregator solutions is that it is often difficult or impossible to manage feed formatted content across various aggregator interfaces. For example, one might maintain a subscription list for wireless access of feed formatted content separately from a subscription list for a web-based aggregator. The problem becomes more significant if one considers maintaining records of what feed formatted content has been viewed, read or recommended across various delivery platforms. Many services peripheral to feed formatted content may also be useful to maintain over various delivery platforms, such as contact lists, calendars, and the like, but again solutions are either currently unavailable or inadequate.

Many aggregators show titles, similar to the news or information pages of any standard website. Often the information on aggregator sites or in aggregator programs, collectively aggregators, has been aggregated from multiple sources, however this is not required. An aggregator as a presentation method may still require a user to selectively view individual titles from a collection of titles. From the presentation standpoint, it may be unclear what the user did or did not read, let alone see. One of the purported uses of aggregators is that an aggregator allows a user to specify only the information they wish to receive, simplifying and filtering the information displayed to them. However, as the number of subscriptions increases or as more information is posted to subscribed feeds, the amount of information a user may be presented with may become overwhelming. A method of filtering or prioritizing subscribed information is therefore desirable.

Feed formatted content is generally designed for transfer over networks and between computers, but transfer of information between users is still not adequately addressed. For example, a user who has read a feed item that they found to be interesting or useful may wish to make that opinion known. Currently, a user might copy link element 108 and post it on another website, or might send it using an email program. It would be useful to make tracking responses, creating and processing recommendations, and generally transferring feed formatted content between individuals easier.

Directories and search engines of feed formatted content exist, published or maintained by various individuals and groups. However, awareness of what kinds of information and specific information sources are available as feed formatted content remains low. Additionally, an individual may not be able to identify the sorts of information they may be interested in receiving. Generally, finding and subscribing to feed formatted content continues to be a difficult and confusing task for many individuals. It would be useful to create a method that allows a user to find feed formatted content to which one may subscribe.

In recent years, several web-based social networks have arisen. A social network may be defined in a few ways. A social network is a list of relationships between one individual and other individuals. A social network may also refer to a recordation of such a list in a database. A social network may also refer to a system of recording the relationships between individuals. Web-based social networks are based on the creation of a user account within the social network and the recordation and display of relationships between the user accounts. One problem with current social networks is that they are isolated a particular social network service. For example, a user of Friendster, a commercially available social network at http://www.friendster.com/, may set up an account at MySpace, another commercially available social network at http://www.myspace.com/. The relationships recorded at Friendster are not available at MySpace. Another problem is that social networks are limited in use on their own. It would be useful to incorporate other services within a social network to increase their utility.

A variety of commercial and private entities as well as individuals provide feed formatted content, others provide aggregation, and others provide social networking. In many cases these service providers make very little or no income at all. It would be useful to provide a method of monetizing feed formatted content and social networks.

Conventional web pages do not separate the display interface, often HTML, from the data being displayed, which is often simply text and images embedded within the HTML. Updates to such standard web pages require a page request to a web server, reloading the data displayed on the page as well as all other interface elements. While this model works well for single information requests, it may not be the best model for information that is more dynamic and suggests frequent loading in a similar interface layout. It would be advantageous to have a method of solving the above inefficiencies in the consumption of feed formatted content and in social networks.

In summary, it would be useful to provide improved methods for social network and feed formatted content creation, management, display, tracking, and monetization.

SUMMARY OF THE INVENTION

One aspect of the invention provides a method of dynamic playlist creation. The method includes receiving a multimedia playlist request including at least one multimedia location indicator, determining at least one multimedia file location based on the at least one multimedia location indicator, and providing a multimedia playlist including at least one of the determined multimedia file locations.

Another aspect of the invention includes a method of providing multimedia content. The method includes sending an authentication request to an authentication node including a first set of user identification information, receiving an authentication reply from the authentication node, providing multimedia location information, receiving a multimedia content request from a user node including a second set of user identification information, determining content ownership based on the first and second sets of user identification information, and providing the multimedia content based on the content request and the determination.

Another aspect of the invention provides a method of operating a feed reader. The method includes receiving a resize input, resizing a feed reader from a first display including a first number of feed items to a second display including a second number of feed items based on the resize input, the first number different from the second number, receiving a scroll request, determining a scroll number based on the second number, and scrolling based on the determination.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

BRIEF DESCRIPTION OF THE DRAWINGS

FIG. 1 illustrates one embodiment of feed formatted content, as known in the art;

FIG. 19 illustrates a schematic diagram of one embodiment of a browser employing a web-based window system of the present invention;

DETAILED DESCRIPTION OF A PRESENTLY PREFERRED EMBODIMENT

Figure 2:
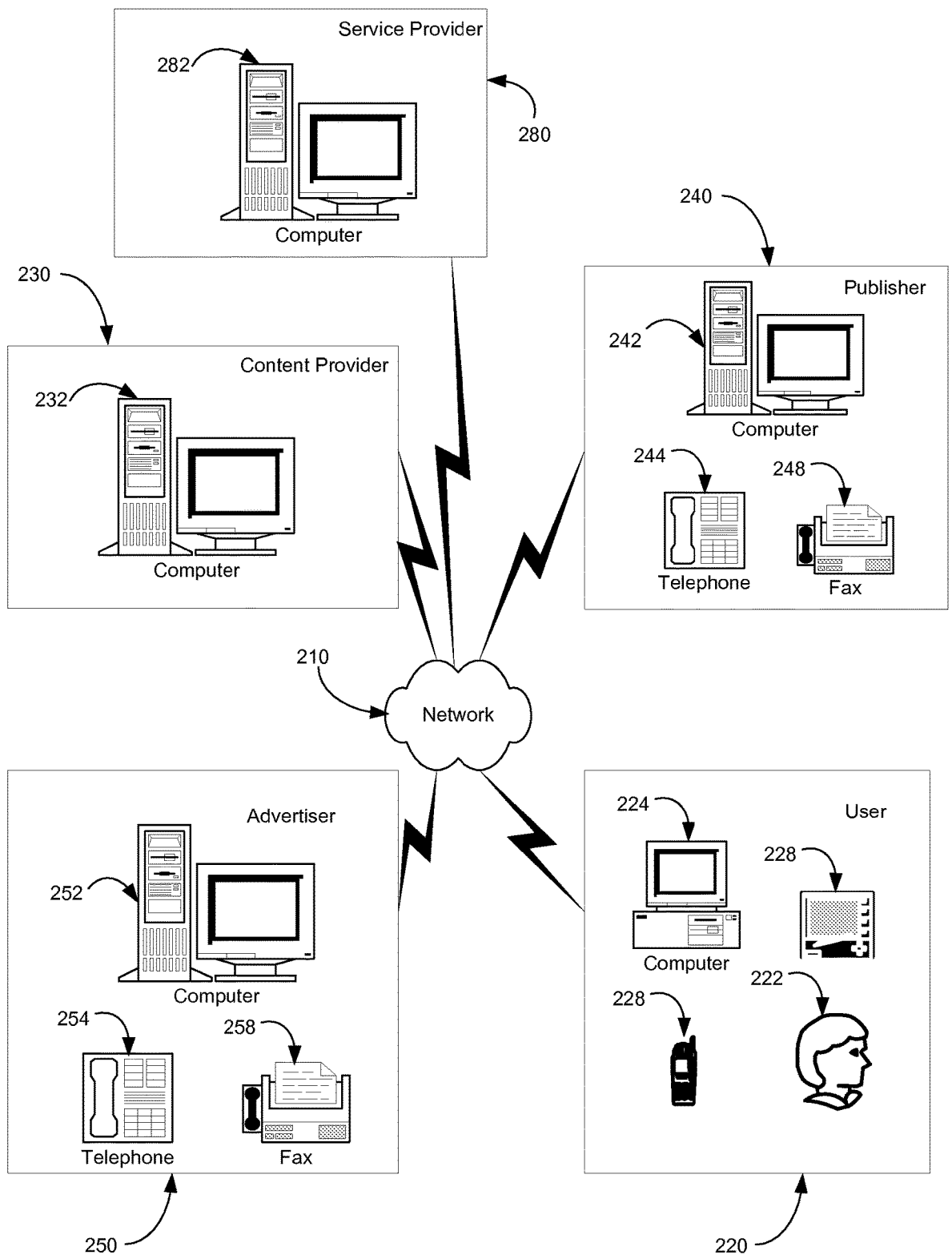
FIG. 2 illustrates a schematic diagram of one embodiment of a telecommunication system of the present invention.

Referring to FIG. 2, a telecommunication system 200 of the present invention is shown. Telecommunication system 200 comprises a network 210 which provides the communications links between the various nodes of telecommunication system 200. Links through network 210 may include permanent connections (e.g., wire or fiber optic cables), temporary connections made through telephone, wireless or satellite communications, or various nodes of telecommunication system 200 may actually be hosted on the same physical hardware platform removing the necessity of a network link altogether. Network 210 may be in the form of public or private connections available over the Internet, an extranet, an intranet, a hard-wired local area network (LAN), a hard-wired wide area network (WAN), a wireless LAN, a wireless WAN, cellular network, satellite network, and/or other forms as would occur to those having ordinary skill in the art.

A user node 220 of telecommunication system 200 operates to facilitate communications information in audio form and/or visual form between a user 222 of user node 220 and one of the other nodes of telecommunication system 200. The information may be requested by user node 220 or may be pushed to user node 220 by another node. Devices, apparatuses and systems, such as for example, a cell phone 226, a personal digital assistant 228, and a personal computer 224 as illustrated, or any other user communication devices may be utilized within user node 220 to establish such communications. Devices, apparatuses and systems around the user may also be considered portions of user node 220, for example a digital signpost or digital billboard 229. Other suitable devices, apparatuses and systems not illustrated include networked household appliances (e.g., televisions, refrigerators, etc.), digital or satellite radio systems, and others as would occur to those having ordinary skill in the art.

A content provider node 230 includes one or more servers 232 for communicating with the other nodes of telecommunication system 200. The requested information, pushed information, and generally provided content can be in a variety of forms, such as, for example, a static or dynamic web page (HTML or XML), a radio or video broadcast or narrowcast, wireless application protocol (WAP) content, a short messaging service (SMS) message, or other forms of network information as known in the art. All content may be provided as the entirety of requested or provided content, or as a portion. For example, content provider node 230 may provide an entire web or WAP page or only a segment of a page. Accordingly, content server 232 can include suitable hardware platforms and software modules to operate as a web site server, a radio broadcast server, etc.

Referring again to FIG. 2, publishing node 240 includes one or more servers 242 for communicating with the other nodes of telecommunication system 200. Publishing node 240 may include apparatus and communications devices such as telephone 244, or fax machine 246. In one embodiment, publishing node 240 provides some portion or all of the content for content provider 230. Publishing node 240 may also publish content or advertisements for advertiser node 250. Publishing node 240 may include interfaces for uploading or inputting by some means content that is to be published via network 210.

Advertiser node 250 represents advertisers that may be any of an end advertiser of a product or service, a marketer, a publicist, a politician, any other similar party, or any party acting as an agent of the advertiser such as a media company, public relations company, advertising agency, or traditional publication. Advertiser node 250 may include apparatus and communications devices such as computer 252, telephone 254, or fax machine 256.

Service provider node 260 represents third party service providers, whose services may be incorporated into the present telecommunications system 200. For example, Mapquest or Google Maps may provide mapping functionality and services. Evite may provide event invitation and response management services. Quova may provide IP-to-geography translation services. Gracenote may supply its CDDB product and services. Friendster, MySpace, or the like may provide social network services. Paypal or Verisign may provide payment services. These service providers are only exemplary, and within each service category other service providers may be available, or another node of the system may provide like service. Service providers may also perform advertising or publishing functions. Service providers may operate as independent nodes of telecommunications system 200, or may provide copies of their code, databases, systems and the like for local installation on another node of telecommunications system 200. Service may be provided in the form of data feeds, application program interface (API), web services, or any other form of communication available in telecommunications system 200 as would occur to one skilled in the art.

While the nodes of FIG. 2 are illustrated and described as solely communicating using network 210, this is only to be considered a best mode, and not limiting. Various nodes, where possible, may communicate using other forms of communication including phone, fax, in-person meetings, mail, and other forms known in the art. In addition, each node may consist of more or fewer communications devices, personnel, and apparatus than are illustrated. Further, while the nodes, and further their component make-up (e.g. servers, databases), are described as operating independently and on separate platforms, it should be well understood by one skilled in the art that various functions of the node or functions of the multiple nodes may be performed on the same physical hardware, or spread in different configurations, arrangements and architectures among the various nodes.

User node 220, content provider node 230, publishing node 240, advertising node 250, and service provider node 260 may each provide or receive feed formatted content. Examples herein will typically focus on XML, and specifically RSS, but it should be understood that other feed formatted content may employ like solutions. The term marker shall typically refer to an element, attribute, or group of elements and attributes within feed formatted content, and the terms marker, element, and attribute shall generally be understood to mean formatted information within feed formatted content.

Feeds may be provided in a variety of ways. A feed may be provided from a Primary Content Provider (PCP), or feed source server, which is an original information source, such as, News.com or the New York Times. The feed from a PCP is accessed from a domain and URL maintained by the original source. Portions or all of the feed or feed content may be written or edited through outsourcing, outside software may be used to generate the feed, and interfaces hosted by another entity may be used in the feed generation. However, a PCP maintains all feed data locally. An Outsourced Content Provider (OCP) is a feed provider that provides feeds in an Application Service Provider (ASP) model. Feed data is managed and maintained remote from the original source, however the feed may still be hosted from a domain or URL maintained by the original source through remote data request. In one embodiment, an OCP may be employed by a PCP to manage the creation of feed formatted content, and the OCP may provide the ability, for example through FTP, to publish the feed formatted content at a server maintained by the PCP. An Aggregate Content Provider (ACP) may generate original feed content, but an ACP receives feed content and redistributes it in one or more feeds maintained by the ACP. Both an OCP and an ACP may be referred to as a feed intermediate server. Each node of telecommunication system 100 may act as, or use the services of, one or more PCPs, OCPs, or ACPs.

It should be noted that delivery of feed formatted content does not necessarily imply that an active push is involved. Delivery of feed formatted content may, in one embodiment, allow that the feed formatted content be made available for request. For example, the feed formatted content may be made available at some universal resource identifier (URI), or at some other location available to a user. Similarly, it should be noted that terms sending feed formatted content or providing feed formatted content do not necessarily imply that an active push is involved. Sending a feed formatted content may, in one embodiment, indicate that the feed formatted content is made available for request. For example, the feed formatted content may be made available at some universal resource identifier (URI), or at some other feed location available to a user. However, the delivery, provision, or sending method for the feed formatted content may not be through request of an XML feed, RSS feed, atom feed, or the like, but rather may involve a more active push of the content.

Feed formatted content may include certain enhancement markers, data and/or formatting to provide enhanced feed creation, management, delivery, organization, interaction, accountability, display, and the like. For example, enhanced feed formatted content may include elements additional to those shown in feed 100. Feed aggregation and display tools may ignore additional elements, and may be capable of aggregating and displaying feed items even if they do contain these additional elements. Inclusion of additional elements or markers within feed formatted content therefore may provide additional benefit if the aggregation and display tool is designed to process them, and may not disrupt standard feed formatted content aggregation and display.

In one embodiment, a link or button may be provided on the IAP or single item window to provide the user with peripheral information regarding an item. For example, peripheral information could include user or other third party commentary on the source or subject of the item, map information, similar items, general information, bonus or benefit information, or the like. For example, a feed item regarding college recruitment at a specific college could include a link to a college rating service. By way of another example, a restaurant special could include a link to rewards network miles per dollar information for the restaurant.

For example, a feed publisher may publish feed formatted content associated with a product or service available for purchase. In one embodiment, when a payment marker is present, an interface may display a "buy now" button or link that takes the user to a purchasing page on some other site. Alternatively, instead of directing the user to a site where they may purchase the product, the service receiving the feed formatted content may hold all necessary information regarding the purchase for the user. In one embodiment, the "buy now" button or link causes a form to be submitted to the merchant site including visible or hidden form elements and user info regarding the purchase and payment details. Alternatively, clicking the button may cause a web service to be called, or some other like communication with an order and/or payment processing service. In one embodiment, the "buy now" button or link may signal the service to process the purchase indicated in the feed formatted content. For example, a user may register for or create a feed that searches EBay® for a particular type of item at a certain price threshold. When that type of item becomes available on EBay for a set price under the threshold, a feed item representing that availability may be inserted into the user's feed and it may include a payment marker. In one embodiment, the payment marker may include the price, the user's EBay login information, the seller's information, an identifier for the particular item up for purchase, or other information relevant to the purchase. The "buy now" button or link displayed on the display interface may submit directly to the EBay site and process the transaction based on the login information and identifier. Alternatively, the "buy now" button or link may submit to a service provider. The service provider may hold a purchase script for EBay as well as other ecommerce sites. When the "buy now" submission is received at the service provider, the EBay purchase script may be executed. The script may include, for example, sending a post request to an EBay purchase page, sending a post request including user login credentials, and a post request confirming the purchase. In one embodiment, the service provider may communicate the purchase in some other manner such as, for example, electronic business XML (ebXML), a web services application program interface (API), or some other form of purchase data transfer. One-click purchasing can in many of the above-described embodiments be achieved separate from a central storefront.

By way of another example, a restaurant may publish feed formatted content, such as, for example, regarding a dinner special for a particular night. The restaurant may be enrolled in a rewards program such as the airline miles rewards program managed by Rewards Network Inc., formerly iDine. Users who are enrolled in this program would benefit from knowing that the restaurant is also enrolled, but that information may be superfluous for non-enrolled users. The restaurant feed formatted content may include a reward marker that either includes information about the particular reward deal at that restaurant, links to the reward deal, or simply indicates that the reward is available.

For example, the reward marker might indicate that twenty airline miles are earned per dollar spent at the restaurant. A feed formatted content display service may hold information regarding what users are registered with the rewards program, and may selectively display the reward availability based on the reward marker and the user information.

In one embodiment, feed formatted content may include one or more event date markers. While it is common practice to include a published date for feed formatted content, it would be advantageous to include a date marker particular to an event referred to in the feed formatted content. For example, feed formatted content provided by Ticketmaster® may include a feed item referring to a concert that will take place in two weeks. The published date reflects the first date the item is displayed in the feed, but the separate event date marker may be used to communicate the actual concert date. A user may specify a user preference that they wish to receive concert information as much as a month ahead of time. The server may provide them with the feed formatted content from Ticketmaster® including the feed item referring to the concert. Alternatively, if the user only wishes to receive information about concerts coming up within the next week, the server does not provide the concert information. In one embodiment, a feed based calendar may be provided. A feed based calendar is a calendar that may associate information in a feed with presentation on the calendar, for example based on an event date marker, recurrence pattern, or the like.

In one embodiment, a server may provide an aggregate feed. The aggregate feed may be a feed made up, at least in part, of feeds for each individual advertiser. In one embodiment, the aggregate feed may be modified by the user to include a subset of the feeds or feed items in the aggregate feed.

In one embodiment, the feed formatted content publishing interface may include one or more options, for example as form elements, to specify one or more enhancement markers. For example, a payment marker, reward marker, event marker, or the like may be added to the content through the interface.

Feed formatted content may be singular in source or aggregated. For example, two restaurants may maintain feeds singular to their establishments. An aggregate channel of restaurant feeds may combine these two feeds to provide an aggregated restaurants feed. Any number of feeds or selected feed items from feeds may be combined to produce an aggregate feed. In one embodiment, a feed item incorporated within an aggregate feed may include an original source marker identifying its singular original source. When the feed formatted content from the aggregate feed is displayed at user node 220, a link to the singular original source or some means of subscribing or unsubscribing the user to or from the singular original feed, such as a button or link, may be provided. In this manner, if the user enjoys information from one singular original source in an aggregate feed, but wishes to unsubscribe from the aggregate feed, an easy method of subscribing to the singular original source has been provided. Alternatively, if the user wishes to maintain a subscription to the aggregate feed, but unsubscribe from one singular original source, an easy method of unsubscribing from the singular original source has been provided. In one embodiment, an aggregate feed is the feeds and feed items within a feed bucket.

In one embodiment, the feed formatted content publishing interface may include interface options for specifying recurrence of feed formatted content. A user may enter one or more recurrence patterns. The publishing node may publish the feed formatted content based on the recurrence pattern. The recurrence selection is associated with at least a portion of feed formatted content. A recurrence publication service may run on the server or against the information on the server. The associated feed formatted content is then selectively published based on the recurrence selection and the recurrence publication service. If the recurrence publication service determines that a new occurrence has occurred, the feed formatted content is published. If the recurrence publication service determines that a new occurrence has not occurred, no new content is published.

For example, the recurrence selection could be expressed via an interface. A user may select that a certain feed item should be published at 5 pm on each Monday. The server may, in one embodiment, store the recurrence selection as a recurrence pattern format such as the standardized iCalendar format. The recurrence publication service may run once a minute to determine if any new items are due for publishing. This may be achieved by selecting one ore more recurrence patterns, for example all recurrence patterns, or active recurrence patterns, or recurrence patterns associated with active feed formatted content or users, and the recurrence publication service then projecting the selected recurrence patterns over the time period since it last ran. If a new occurrence falls into that time period, the feed formatted content may then be published. In one embodiment, the publishing node may insert at least one globally unique identifier in the feed formatted content based on the recurrence selection. This globally unique identifier may indicate to feed aggregation programs that the feed formatted content is fresh, even though it is recurring in nature. In one embodiment, a recurring content identifier may be inserted with the published content. A feed aggregation program may be configured to allow a user to filter out feed formatted content containing a recurring content identifier associated with recurring feed formatted content. In one embodiment, a conditional publishing rule may also be associated with the feed formatted content. The feed formatted content may be published based on both the recurrence pattern and the conditional publishing rule.

In one embodiment, the feed formatted content may include a different globally unique identifier (GUID) for some portion of the feed formatted content based on the recurrence pattern. A different GUID may allow a feed aggregator to recognize recurring feed formatted content as unique. Alternatively, the published date of one or more portions of the feed formatted content may change based on the recurrence pattern, and may provide a uniqueness indication.

In one embodiment, the published feed formatted content may include a recurring content identifier (RCID). The RCID may indicate that at least a portion of feed formatted content is recurring in nature.

In one embodiment, publishing node 240 may receive calls from advertisers at a call center. If the advertiser has never worked with publishing node 240 before, account information may be entered into an advertiser database. In one embodiment, the account information may include information to be displayed on a landing web page for the advertiser or the advertiser may designate a URL for a landing web page. A feed may be established exclusively for the advertiser to hold the feed formatted content that is ordered. The feed formatted content ordered by the advertiser may be placed in a feed with other feed formatted content.

In one embodiment, a feed formatted content publishing interface may be provided, for example at a web site that allows users, advertisers, advertising agencies, or any other entity to log in to an account and create feed formatted content. For example, an advertiser may log into their account and encounter a page that includes a form requesting title, link, and description information that will be converted to feed formatted content and included in the advertiser's feed. Given the various methods by which feed formatted content may be created or published by publishing node 240, different pricing methods may be established to charge for the publication and management services. For example, publishing node 240 may charge a certain amount for a phone order but allow submissions via an online interface for a cheaper price or for free.

In one embodiment, the feed formatted content publishing interface may include the option to provide one or more conditional publishing rules. A user may enter one or more conditional publishing rules. The conditional publishing rules are associated with at least a portion of feed formatted content on the server or at an alternate location. The publishing node publishes the feed formatted content based on the conditional publishing rules. A conditional publishing rule may be a weather condition, a sporting event, a financial event, reservation availability, a product sale, or some other determinable condition. For example, a bar may have a beer garden open on weekend nights. A recurrence pattern may be associated with feed formatted content regarding the special. The recurrence pattern may indicate to publish the feed formatted content on Friday and Saturday of each week from May until November. The weather condition may be determined, in one embodiment, for example, by temperature or weather condition information in feed formatted content from a weather publishing service provider node. However, if one of those weekend days is not warm and/or has rain, the bar may wish that the feed formatted content not be published that day. A conditional publishing rule may be associated with the feed formatted content indicating that it should be published only if the weather is over a certain temperature. Another conditional publishing rule may be associated with the feed formatted content indicating that it should not be published if it is not raining. Weather information may be provided, for example, as feed formatted content by a service provider. The publishing node may receive the weather information and selectively publish the feed formatted content based on the weather information and the conditional publishing rules. Other examples of conditional publishing rules include rules based on portions of or outcomes of sporting events, stock prices, product sales, reservation availability, or the like. A service provider may provide such information, or it may be provided by the publishing node, or by the advertising node.

In one embodiment, the feed formatted content publishing interface may include tracking information. In one embodiment, the publishing node may collect the tracking information for display on the interface. Alternatively, the publishing node may employ a service provider for the tracking information such as, for example, that provided by Feed-Burner™. A publishing node hosts a private version of feed formatted content. The publishing node may receive a request a public version of feed formatted content. The publishing node may request a second private version of feed formatted content based on the first private version of feed formatted content. The publishing node may publish the public version of feed formatted content based on the second private version of feed formatted content.

In one embodiment, the publishing node may register the first private version of feed formatted content with the tracking information service provider. The publishing node may post the URI of the private version of feed formatted content and provide it to the tracking information service provider. Other information may be included in the post such as publisher information, feed title, URI information, or feature selection information. The publishing node may store the tracking service identifier, for example URI of the second version of the feed formatted content as provided by the tracking information service provider. In one embodiment, the publishing node may cache the second version of the feed formatted content. The publishing node may, when it receives a request for the public version of feed formatted content, request the second version of the feed formatted content, and publish that feed formatted content to the requestor. Alternatively, the publishing node may provide the cached feed formatted content. The publishing node may request tracking information from the tracking information service provider and provide it, for example displaying it to a user via the feed formatted content publishing interface. In one embodiment, the publishing node may cache the tracking information. In one embodiment, the private version of the feed formatted content may include one or more recurrence selections, one or more conditional publishing rules, or a combination of selections and rules, and may be published based on these selections and rules.

In publishing feed formatted content, many uses may be achieved by tracking use and other response information with regards to the content or feed itself. Feed access, also called subscription, may be recorded anonymously or indexed to a particular user. For example, a request for a feed may not include personally identifying information regarding user node 220 that made the request. Alternatively, a request may be made from an identified user node 220. User characteristic information input is received into the system either through association with the anonymous request, the request itself indicating the characteristic of a user that has requested that feed or geographic location of the request established by IP address to geography translation, or through association with the user characteristic information associated with the identified user node. Characteristic information associated with the identified user node may include other feeds requested, feed access frequency, feedback received from the user with regards to one or more feeds or feed items, access frequency, age, sex, location, or other user information held in a profile or established by other means.

In one embodiment, profile information may be collected by the IAP either at registration or at some other time. This information may be used to provide profiled feed response tracking, and further to make feed and feed item recommendations to IAP users.

User profiles may be maintained by feed aggregation and display software at user node 220, at content provider node 230, at publishing node 240, or at advertiser node 250. The characteristic information received or input is then used to determine a characteristic profile of the requestor. Feed formatted content response data is then received and collected by the receiving node. Feed formatted content response data, collectively response data, may take many forms. In one embodiment, response data is related to feed formatted content interaction. For example, continued feed requests, discontinuance of feed request, or recorded removal of feed subscription may constitute response data. Further, response data may include clicking on links in a feed item, or other access of online resources referenced in the feed item. A cookie associated with the feed request may be employed to track indirect access of resources listed in or referenced in a feed item. For example, a feed item may reference a sale being held on a particular website and a link may be provided in the feed item to access that web site and a cookie associated with the request displaying that feed item may be placed at user node 220. If the user clicks on the included link, this action may be received as feed item response data. If the user later visits the web site, the cookie identifies them as having received the feed item and this action may be received as feed item response data.

Another method of receiving feed item response data includes the use of a user survey, and reception of associated user survey input. A feed item may include this user survey in its content. For example, a displayed feed item may have a link that says, "I liked this information." If the user clicks on this link, it is received as feed item response data. There are many types of surveys that may be included, such as, providing the user the ability to rank the feed formatted content on a scale of one to ten, to provide a basic good or bad response, or to provide free form written response. The survey may be displayed with the feed item, or there may be a link to the survey in the feed item, or the resource available by following link element may include the survey.

Received feed formatted content response data is recorded in a characteristic profiled response database. This data may then be used for many purposes. For example, reports may be generated with individual or aggregated response information for feed publishers or other entities. For example, aggregate response information may be provided via an online interface to allow potential subscribers to view feed formatted content popularity or other feed formatted content characteristics. Collaborative filtering may be applied over the characteristic profiled response database to provide feed formatted content recommendations.

One embodiment of the present invention provides for sponsorship of feed formatted content. Sponsorships may be provided for entire feeds, for aggregate feeds, for individual feed items or subsets of a feed, or for groups of feed formatted content. Sponsorships may be provided in a variety of ways. For example, a feed item may include extra text in the description or title element indicating the sponsorship. Alternatively, when a link in a feed item is clicked, the user may be taken to an intermediate sponsorship page. An intermediate sponsorship page is a page that audibly or visibly indicates association with a sponsor. This intermediate sponsorship page may include a link to the actual desired content, or the page may refresh to display the desired content after a set period of time. In one embodiment, feed formatted content may include an audio or visual marker that is identified and played by the IAP when the feed formatted content is accessed. For example, when a feed formatted content is retrieved from News.com, an audio marker may be included for Intel. When the feed formatted content is provided, the audio marker may be identified and a linked audio file may be played that says, "This News.com feed is sponsored by Intel," followed by the Intel jingle.

A geographic region identity is a set of parameters that define a geographic point or area. For example, a geographic region identity may be specified by providing a center point, be that a zip code, city, or precise longitude and latitude coordinates, and also providing a radius from that center point. When a zip code, city, or the like is provided as a point, the system may determine a latitude and longitude point within the provided area, for example at the centermost point. In one embodiment, the geographic region identity includes the entire zip code, city, or like area in the geographic region identity even if portions of it would be excluded by the determined center point and the provided radius. Alternatively, only the area determined by the center point and the provided radius are included in the geographic region identity. Providing multiple points that form a polygon may also specify a geographic region identity. Again the points may be zip code, city, or latitude and longitude coordinates, and the same inclusion and exclusion embodiments are included as described above. In one embodiment, a geographic region identity includes one or more zip code, city, state, country, or other region selections. In one embodiment, a geographic region identity may be determined by any combination of the above-described embodiments. For example, a center point and radius may be specified in addition to a list of cities to include. As another example, multiple center point and radius pairs may be specified. A geographic region identity may also include areas of exclusion. For example, a center point and radius may be specified that includes ten zip codes, but the user may specify that one of those zip codes is to be excluded.

In one embodiment, a geographic region identity may be determined based on double or single confirmation targeting. A geographic region identity may be determined based on a user profile on a site supplying the feed formatted content, or it may be determined from a profile on another site, such as Yahoo®. Alternatively, a geographic region identity may be determined by IP-to-geography translation. An IP-to-geography service, such as that provided by Digital Envoy, may be used to determine the location of the request.

The geographic origin of a request for sponsored feed formatted content may be determined in a variety of ways. The geographic region identity a sponsor has designated may be included in proposal information. Alternatively, a sponsor database holding sponsor information may include location information that may be associated with one or more sponsorship proposals. In one embodiment, the determination of feed formatted content sponsorship association 1710 and/or 1810 includes the geographic region identity. In one embodiment, the provision of a sponsored feed formatted content 1712 and/or 1812 includes the geographic region identity. Based on the geographic origin of a request for feed formatted content, a sponsor may be associated with the feed formatted content. Different sponsors may be associated with the same feed formatted content based upon requests for feed formatted content from different geographic origins. Different sponsors may also be associated with the same feed formatted content based on day part, profile demographics or any other method of online targeting known in the art.

In one embodiment, a sponsor may specify an author of feed formatted content in their sponsorship request or in their response to a sponsorship request. For example, a request for feed formatted content sponsorship may have multiple authors, and author markers may be included in the feed formatted content to identify each author. A sponsor may select to portions of the feed formatted content that is from one or more authors by including the author or author marker in their proposal information. An individual author of feed formatted content that is displayed in multiple feeds may also submit a request for sponsorship, and sponsorship associations may be made in association with that author.

In one embodiment, the user can read off the coupon numbers to the restaurant to get his discount. In one embodiment, the coupon will include a bar code, which can be read through the phone into a bar code scanner to receive a discount. In one embodiment, the bar code may be included in feed formatted content as a bar code marker. The bar code marker may include a link to a bar code image, or a code to generate a bar code. For example, a bar code marker may include numerical information that may be translated into a bar code. A program on the cell phone of the user may convert the received numerical information into a bar code display. This displayed bar code may be scanned, for example, at a standard checkout desk. Location information may be determined by GPS, signal triangulation, user profile information, any other method known in the art, or a combination of these methods, for example providing double confirmation targeting.

One embodiment of the present invention includes an Independent Access Portal (IAP). An IAP may include one or more of the functions of feed formatted content aggregation, management, and/or display. An IAP may incorporate, internally or externally, a variety of services such as, for example, social networking functions, messaging, wikis, bookmarking, or the like. An IAP may perform processes and methods such as feed aggregation, unique feed provision, as well as others included in this application. An IAP may include, produce, or use markers to allow enhanced feed provision, such as those that have been and will be described. In one embodiment, the IAP may be software at the user node 220, software at an OCP or ACP, or a combination of the two. The IAP may include one or more web based, cell phone, desktop application, or other user interfaces. For example an interface might be a standard web page, or combinations of web content and software. The term IAP may refer to any of these, and the term IAP server may be used to designate software or interfaces not held at user node 220, but one skilled in the art should understand that various aspects of the programming may be transferred between nodes and not depart from the spirit of the invention.

Figure 3:
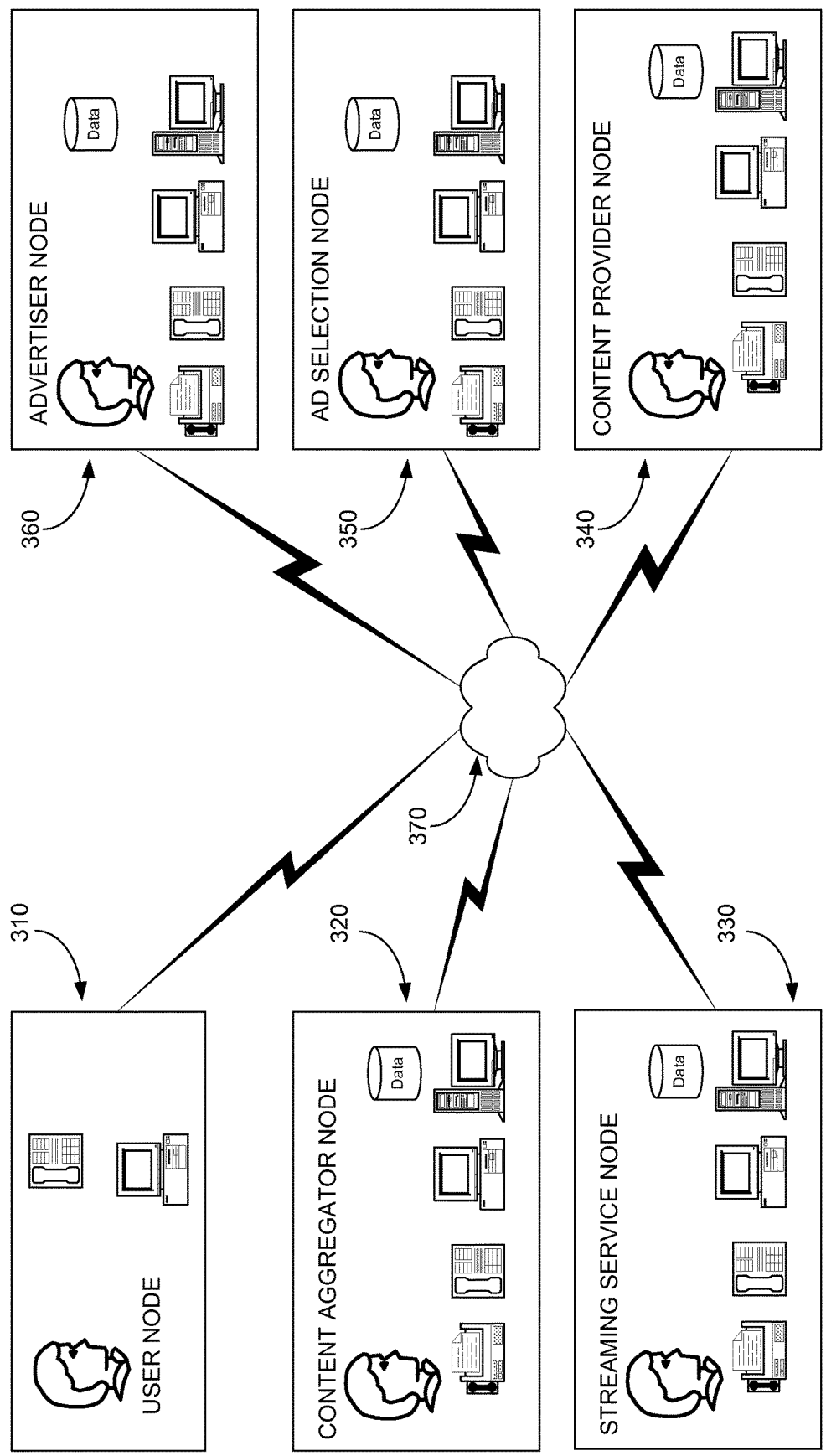
FIG. 3 illustrates a schematic diagram of one embodiment of a telecommunication system of the present invention.

FIG. 3 illustrates a schematic diagram of one embodiment of a telecommunication system of the present invention at 300. Telecommunication system 300 comprises a network 370 which is the media used to provide communications links between the various nodes of telecommunication system 300. Links through network 370 may include permanent connections (e.g., wire or fiber optic cables), temporary connections made through telephone or wireless communications, or various nodes of telecommunication system 300 may actually be hosted on the same physical hardware platform removing the necessity of a network link altogether. Network 370 may be in the form of public or private connections available over the Internet, an extranet, an intranet, a hard-wired local area network (LAN), a hard-wired wide area network (WAN), a wireless LAN a wireless WAN, and/or other forms.

A user node 310 of telecommunication system 300 operates to facilitate communications of requested information in audio form and/or visual form between a user of user node 310 and one of the other nodes of telecommunication system 300. Devices, apparatuses and systems, such as for example, a cell phone, a personal digital assistant, and a personal computer as illustrated, can be utilized within user node 310 to establish such communications. Other nodes of telecommunication system 300 include Content Aggregator Node 320, Streaming Service Node 330, Content Provider Node 340, Ad Selection Node 350, and Advertiser Node 360. All of these nodes may include various communication components including telephones, faxes, PDAs, personal computers, servers, databases, and the like.

Figure 4:
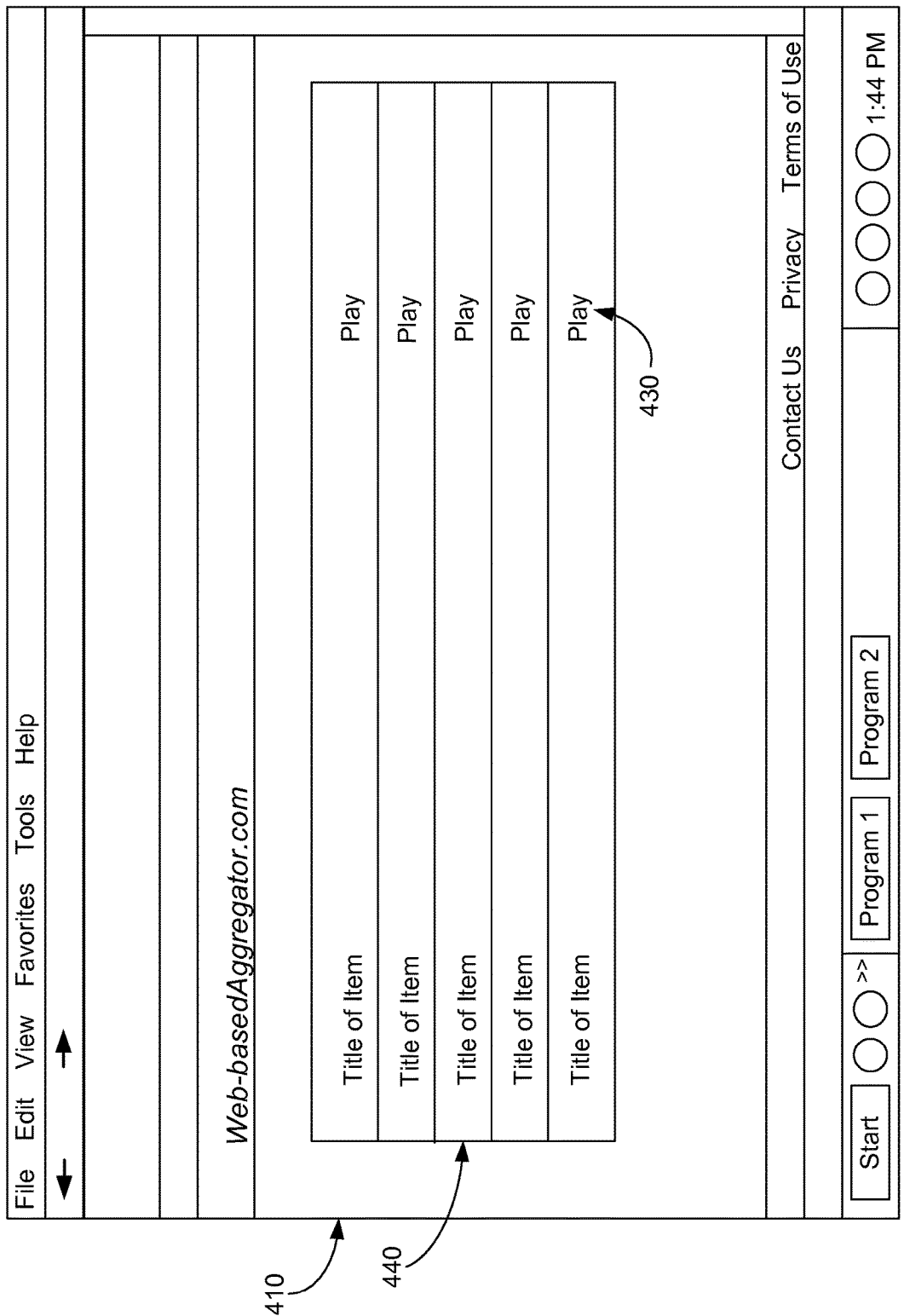
FIG. 4 illustrates a schematic diagram of one embodiment of a web site of a telecommunication system of the present invention.

FIG. 4 illustrates one embodiment of a web site of telecommunication system 300 at 400. The site is displayed in web browser 410. The site includes at least one item being displayed, or a list of items 420. Each item may include a play button or link 430.

Figure 5A:
FIGS. 5a-c illustrate schematic diagrams of embodiments of browser based streaming media players of the present invention.
Figure 5B:
Figure 5C:

FIGS. 5a-c illustrate embodiments of a browser based streaming media player at 500a-c. The browser based streaming player may include a standard media player such as Windows Media Player® at 500a.

In one embodiment, the browser based media player may not display the default interface. Interaction with the media player functions such as play, pause, next, and the like may be provided by javascript commands or some other method of interfacing with the media player. In one embodiment the javascript or other commands may provide additional logic or functions other than exclusively playing, or pausing the media. For example, the javascript may perform an Asynchronous Javascript and XML (AJAX) call to determine if an alternate file should be played when the next button is clicked.

The browser based streaming player may alternatively be built using such client-side capability-rich languages as java or flash at 75b-c. Capabilities and information display may include, for example, information about what is playing, what will play next, news items, or some other message, favorite media sources, subscribed media sources, or the like.

Figure 6:
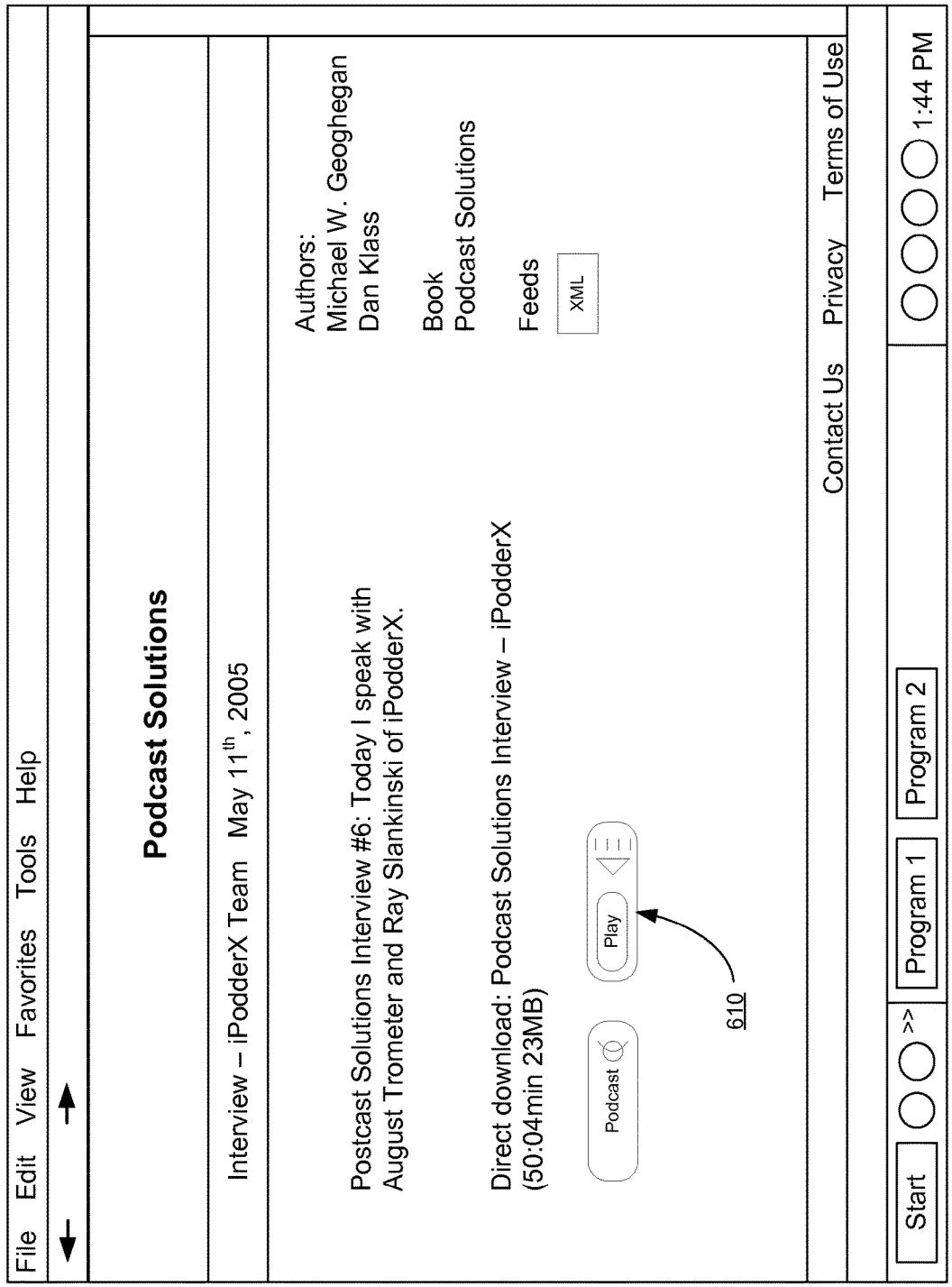
FIG. 6 illustrates a schematic diagram of one embodiment of a website of the present invention.

FIG. 6 illustrates an embodiment of a website at 600 that incorporates a play button 610 that launches a third party web based media player 7500a-c.

Figure 7:
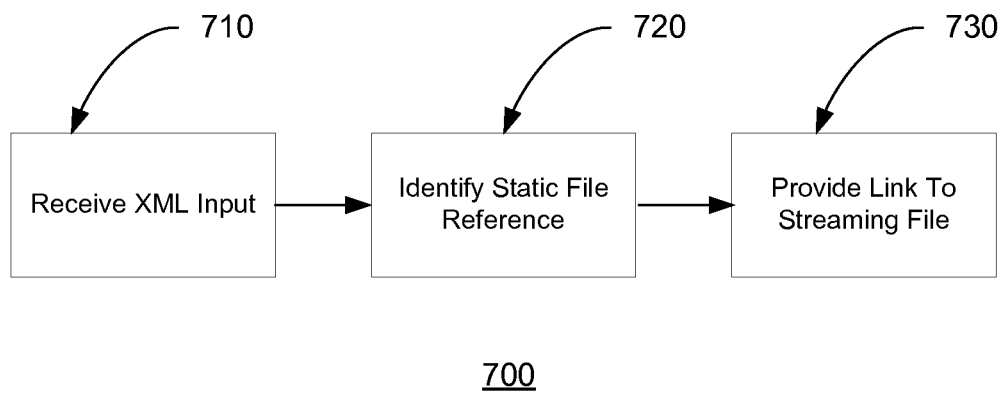
FIG. 7 illustrates a flowchart representative of one embodiment of a method for providing streaming access to a static file.

FIG. 7 illustrates a flowchart representative of providing streaming access to a static file at 700. Feed formatted content input is received 710, for example a podcast. This feed formatted content may include a reference to a static media file such as: http://www.podcastsample.net/song.mp3. This example is an mp3 file, but the file may be video, audio, or any other type of media file. The static file reference is identified 720, and an alternate link may be provided. For example:

http://site.com/XML/cast.aspx?q=http:/I www.podcastsample.net/song.mp3. This link may launch a web based media player 7500a-c. Alternatively, a link may be provided such as:

http://site.com/XML/cast.m3u?q=http:/Iwww.podcastsample.net/song.mp3. An m3u file is a media queue format, also generally known as a playlist. It is the default playlist save format of WinAMP and many other media programs. It allows multiple files to be queued in a program in a specific format. Clicking on a link to an m3u, or providing it as the destination file for a web based media player prompts a media player to attempt to stream the content at the one or more locations provided in the m3u file. Static m3u files may be created with the static file references in the received xml input, and the link provided to a streaming file 730 may be this new static m3u file. Alternatively, the m3u file itself may be a dynamic file. For example, the m3u file extension may be mapped to a processing program. For example, the ISAPI DLL for processing ASP.NET pages. The above referenced m3u URL could be processed by the following code:

<%=Request.QueryString["q" ]%>

The above describes one embodiment of dynamic playlist creation. The podcast is an example of a multimedia location indicator, other multimedia location indicators may be, for example, a URL referencing a static multimedia file. A multimedia file location is determined based on at least one multimedia location indicator. When a request is received for a multimedia playlist is received including one or more multimedia location indicators, a multimedia playlist is provided based on the indicators included in the request.

Figure 8:
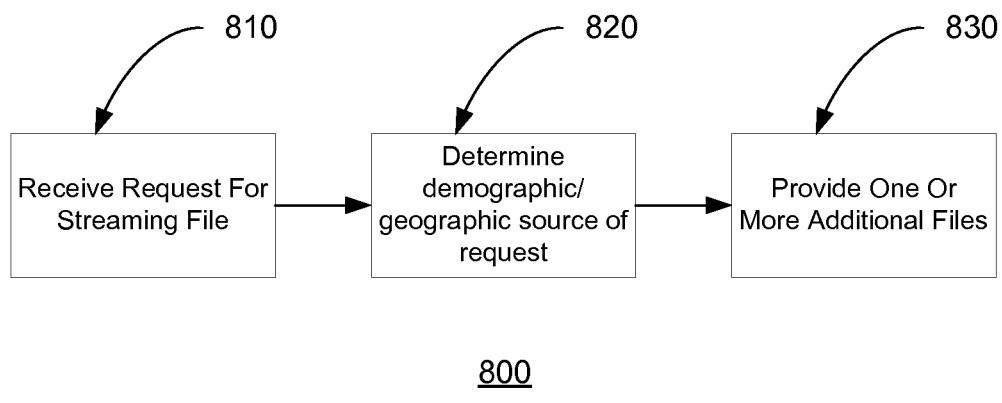
FIG. 8 illustrates a flowchart representative of one embodiment of a method for providing streaming access to a static file.

FIG. 8 illustrates a flowchart representative of providing streaming access to additional static files at 800. A request for a streaming file is received 810, for example the request for http://site.com/XML/cast.aspx?q=http://www.podcastsample.net/song.mp3.

In one embodiment, the request may be from a registered user of a system. In one embodiment, a cookie, or querystring parameter, or user profile, or IP-to-geography, or any other method of determining demographic or geographic region identity information about the source of the request 820 may be used. In one embodiment, that file may include one or more additional lines so that the file may appear with the following code:

```
http://site.com/gritCast.wav
<%=Request.QueryString["q"]%>
```

Alternatively, one or more additional files may be included in the streaming file 830. The one or more included additional files may be based, at least in part, on the determined demographic, geographic, or time information, recurrence patterns, conditional publishing rules, or other targeting methods. For example advertisements may be included, or a file announcing the brand of the web based media player. In one embodiment, the multimedia file included in the playlist may vary based upon the determined information.

Additional information may be used to determine an advertisement in addition to or separate from demographic or geographic information. For example, the subject of a multimedia file may be determined and the ad selected based in part upon this determination.

Figure 9:
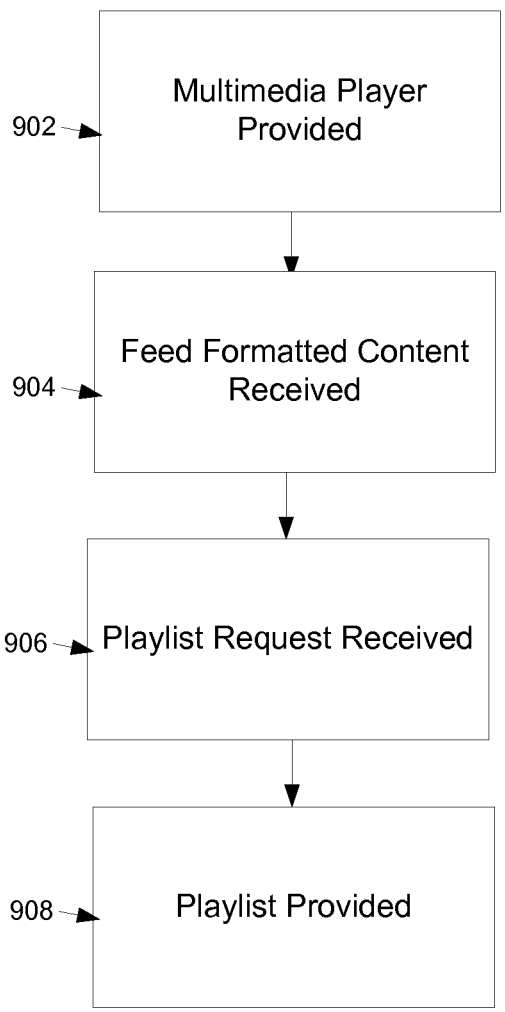
FIG. 9 illustrates a flowchart representative of one embodiment of a method for illustrating providing multimedia.

FIG. 9 is a flowchart illustrating one embodiment of a method for providing multimedia at 900. A multimedia media player is provided at 902. Feed formatted content is received at 904, the feed formatted content including at least one multimedia marker, such as, for example, an enclosure tag indicating a multimedia file. A playlist request is received from the multimedia player at 906. A playlist, including at least a portion of the multimedia marker is returned at 908. A characteristic profile response database may be provided, and the playlist may be based on the characteristic profile response database. A request for sponsorship may be received, and the playlist may be sponsored based on the request. A multimedia file may be associated with the request for sponsorship, and the sponsored playlist may associate the multimedia file with the playlist.

In one embodiment, a launch code generation page may be provided. A user may enter a multimedia target, such as, for example a location of feed formatted content, a multimedia file, a playlist file, or the like, and the launch code generation page could return page description language operable to launch the multimedia player including the multimedia target. For example, a combination of HTML and javascript may be provided to launch the multimedia player. In one embodiment, a custom skin may be provided for the multimedia player. For example, a user may select what skin they wish to have on their player. Alternatively, the skin may be associated with a sponsor. The skin may be based on the playlist request. In one embodiment, a user may specify a skin on the launch code generation page from a list of options. The launch code may include a skin specification. Alternatively, the user may specify a location where the image files required for the skin are located, thus providing a custom skin. The image files may also be submitted to a destination on a site or server associated with the multimedia player. In one embodiment, this may be added to the list of available skins for other users to select from.

Figure 10:
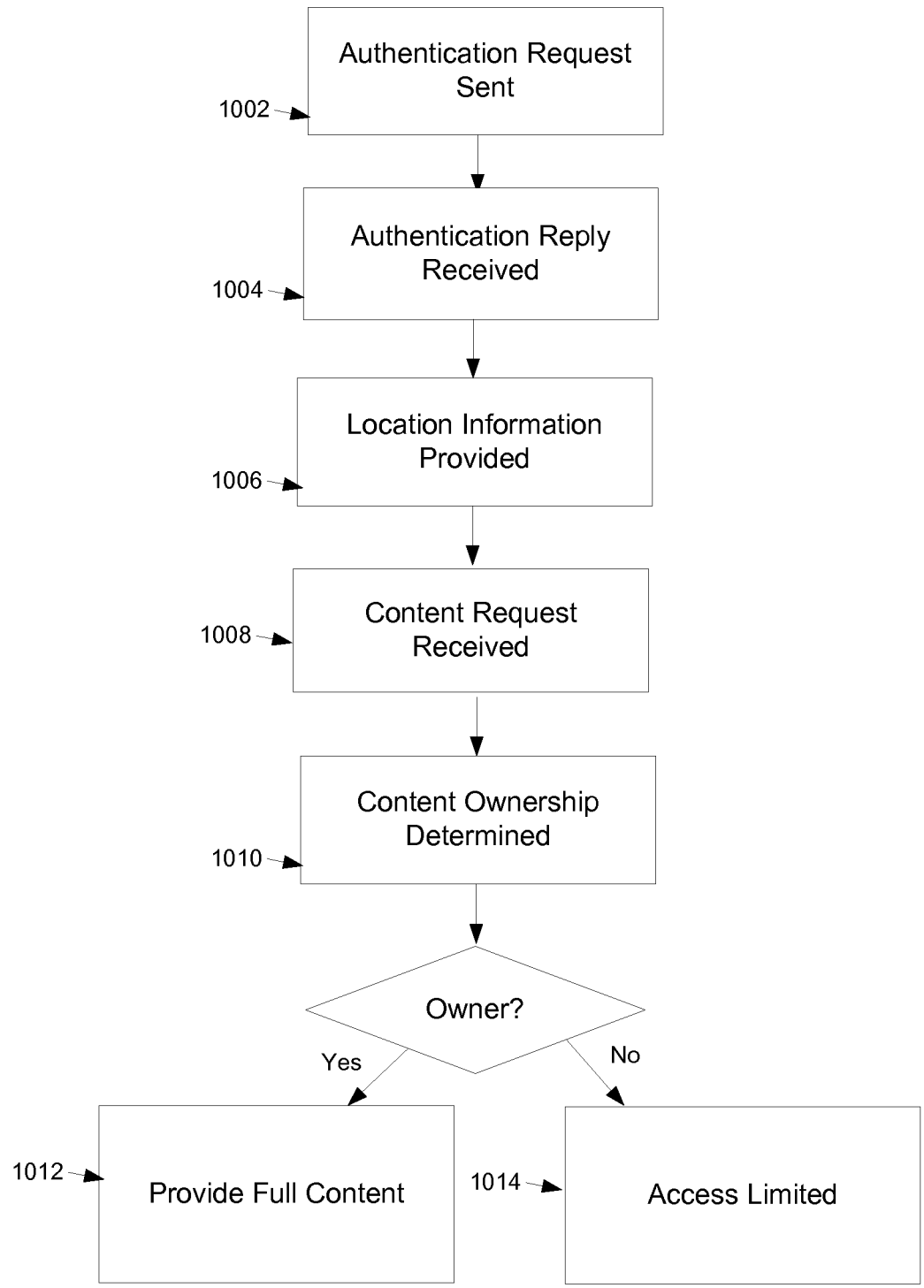
FIG. 10 illustrates a flowchart representative of one embodiment of a method for personal podcast serving.

FIG. 10 is a flowchart illustrating one embodiment of a method for personal podcast serving at 1000. An authentication request is sent to an authentication node at 1002, including a first set of user identification information. An authentication reply is received from the authentication node at 1004. Multimedia location information is provided at 1006. A multimedia content request is received from a user node at 1008, including a second set of user identification information. Ownership of the multimedia content is determined at 1010. When it is determined that the content request is from the owner of the multimedia content, the full content is provided at 1012. When it is determined that the content request is not from the owner of the multimedia content, access is limited 1014. In one embodiment, a non-owner has no access to the multimedia file. Alternatively, only a portion of the file may be provided. For example, a twenty-second clip may be provided. Alternatively, a formula may be applied to determine the provided portion. The formula may be based upon total length of the multimedia file, the multimedia file size, the type of multimedia file, multimedia content patterns, or some combination of these and/or other factors. Multimedia content patterns include expected intro and closing segments of the content, song repetition patterns and the like. For example, it may be determined that songs in general, songs within a particular genre, or songs from a particular artist tend to include an intro, a verse, a chorus, a verse, a chorus, a bridge, a chorus, a chorus, and a closing. Continuing the example it may be determined that these segments generally constitute ten, fifteen, ten, fifteen, ten, twenty, ten, ten, and fifteen percent of the song and file respectively. A representative sample of the song may include both chorus and verse, so the selected clip may begin thirteen percent of the way into the song in order to most likely include both segments. In one embodiment, the segment may be selected randomly and/or recalculated on each request. Alternatively, the same segment may be played on each request, and the start point of the selected segment may be stored in association with the file. As another alternative, access limitation 1014 may include directing the user to an alternate multimedia file. The alternate multimedia file may announce the access limitation, or in another embodiment the alternate multimedia file may be a designated sample multimedia file associated with the requested multimedia file.

For example, in one embodiment, a user installation program or executable file may be provided. The user may install or run the program on, for example, an Internet connected personal computer. The program sets up a file server on the user computer. The user provides, or the program scans for, location information for files on the computer. For example, the program may scan the hard drive for mp3 or other multimedia files. The program may provide an opportunity for the user to log in, for example using a username and password. The user may also set up a new account. The user login and account information is authenticated and recorded at a control server. In one embodiment, the authentication information is associated with the URL or IP address of the user computer. The program may provide multimedia file location information during authentication, or may provide the information based on a request. For example, the multimedia file information may be provided as feed formatted content, or podcast format, including multimedia markers such as enclosure tags indicating file locations served by the program. The multimedia file information may be publicly available and accessible or may require remote authentication to request or receive it. In one embodiment, the user may log in to a program, website, or the like at a second Internet connected computer. For example, the same username and password may be supplied as was supplied to authenticate the file-serving program. Based on this authentication information, the control server may provide the multimedia location information. A multimedia player may be provided to play the multimedia files based on the multimedia location information. For example, the multimedia player may accept the multimedia location information in feed format. The multimedia player may make a request of the file-serving program for one or more of the multimedia files. When the request is received by the file-serving program, the file-serving program may authenticate the request in a variety of ways. For example, the request may include the authentication information, such as username and password. Alternatively, the request may include the IP address of the source of the request, and the file-serving program may send an authentication request to the control server to determine if this IP address is associated with the same user as is associated with the file-serving program. For example, when the user logs in at the second computer, the control server may record the IP address associated with that log in. If a request is received for the multimedia content from a node other than one that has been authenticated as being associated with the same user as the user associated with the file-serving program, the file access may be limited. This limitation determination may be termed access availability. In one embodiment, full access may only be provided to the location most recently authenticated by the user.

In one embodiment, when an non-owner requests a multimedia file, a payment marker or some other purchase opportunity may be associated with the multimedia file. For example, mp3 files may contain 103 tags describing the audio file, such as artist, track, album, and release information. This information may be used to determine a payment marker or purchase opportunity either directly from the control server or from an alternate server or another merchant or affiliate such as, for example, iTunes or Napster. Services such as those provided by Gracenote® may also be employed to determine what file is being requested and an associated payment marker or purchase opportunity. An opportunity to purchase a multimedia file may be referred to as a full version purchase option. The user may immediately request to purchase the file, or they may enter a contingent purchase request. In one embodiment, a user, for example of the IAP system, may recommend a multimedia file to the IAP community or to another individual, for example in that user's social network, or via an automated recommendation email. In one embodiment, a user's music location information, or playlist, may be available on an associated profile page for that user on the IAP.

Figure 11:
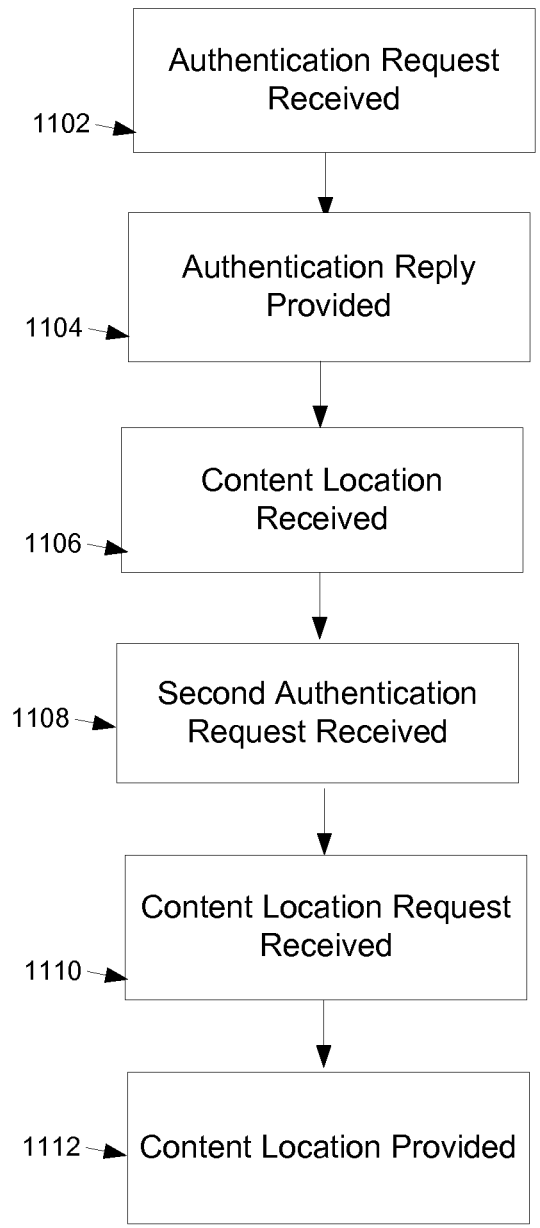
FIG. 11 illustrates a flowchart representative of one embodiment of a method for personal podcast serving.

FIG. 11 is a flowchart illustrating one embodiment of a method for personal podcast serving at 1100. An authentication request is received at 115, including a first set of user identification information. An authentication reply is provided at 1104. Multimedia content location information is received from a first user node at 1106. An authentication request from a second user node is received at 1108, including a second set of user identification information. Multimedia is provided to the second user node at 1110. The first set of user authentication identification information may be cached. The second set may be cached. A current login location request may be received from the first user node. A current login location may be provided, in one embodiment based on the second set of user identification information. A recommendation request may be received from the second user node, including a third set of user identification information and at least one multimedia content location. A user may be indexed to the multimedia content location based on the recommendation request. A third authentication request may be received from a third user node, including a set of user identification information, and the multimedia content location may be provided to the user based on the indexing. The multimedia content location may include purchase opportunity information based on the multimedia content information. Supplementary multimedia may be associated with the original multimedia file request, the recommendation request, or the like. For example, a user may associate an audio file with a video file and recommend them in tandem. The audio file may be, for example, commentary recorded by the user of the user regarding the video file. For example, a coach may host video files of particular games or plays in games, and may record commentary that may be associated with the video. Different audio may be associated with the video for different users, such as, for example, different players the coach forwards the video to.

In one embodiment, images and/or multimedia clips are indexed to a feed item and presented as a play list. The play list can be scrolled over in a feed item viewer. In one embodiment, when a cursor is positioned on a feed item, or a user input is received, a preview is displayed with the image or a portion of the multimedia clip. In one embodiment the preview can be a separate movable viewer that may be sized as desired and moved to a desired location on the page or added to a pile. The pile may then be captured in a template viewer. A title for a feed comprising the items in the pile may be provided. The items within the new feed viewer can be reordered by, for example, dragging the items above or below and clicking. A display time for images and the length of the multimedia files may be summed. An audio feed or set of feed items may be displayed. The audio files that are displayed as feed items may be selected by the user to match with image or video feed items. If the audio file play times and the image or multimedia files don't match up, the last audio file can be faded out early or the image display times can be adjusted or the video clip may be faded out early based on a user selection. The options may be presented in the user interface. Once selected, the modified audio items may be indexed to the image/multimedia feed. The joint image/multimedia and audio feed can be converted to a play list or play list feed. When accessed by a user, the audio and image/video content may be streamed simultaneously to provide the presentation at a remote computer. The image/multimedia and audio can be streamed from multiple source computers. In one embodiment, sponsorship may be provided associated with the created feed.

Personal podcast serving may be provided in conjunction with a variety of existing services. For example, the personal podcast server may be implemented for web-based music programs such as Last.fm, or as a plug-in for an existing media player such as iTunes, Windows Media Player, or the like. Playlists created in iTunes, or some other multimedia file management program, may be selected for publication as personal podcasts. In one embodiment, when one or more files are selected for inclusion in a personal podcast, a warning may be provided to the user based on files that maintain digital rights management. For example, if a user selected to publish an iTunes playlist, one or more of the songs in that list may be a protected MPEG-4 audio file. Some users attempting to play or access that file may be unable to use it.

Figure 12:
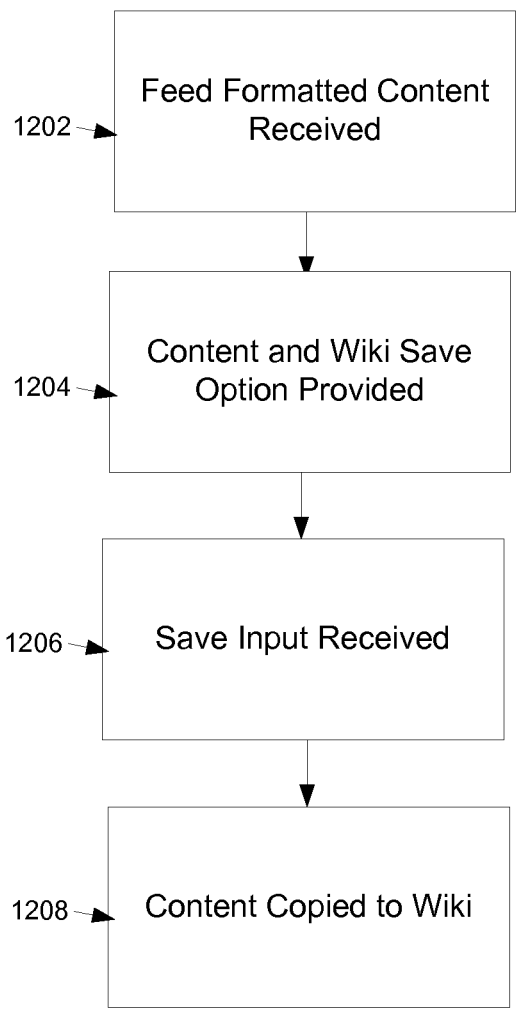
FIG. 12 illustrates a flowchart representative of one embodiment of a method for providing a wiki.

In one embodiment, wikis may be used in conjunction with feed formatted content. FIG. 12 is a flowchart illustrating one embodiment of a method for providing a wiki at 1200. Feed formatted content is received at 1202. A content and wiki save option is provided at 1204. Save input is received at 1206. At least a portion of the feed formatted content is copied to a wiki at 1208. In one embodiment, the content is saved to a new wiki. In one embodiment, the content may be saved to an existing wiki. In one embodiment, the save input may include a wiki identifier, and the content may be saved to an existing or new wiki based on the wiki identifier. A list of available wikis may be included as at least a portion of the content and wiki save option.

In one embodiment, individual wikis can be presented in a wiki feed as feed items. Scrolling over the items, or clicking on them can present a preview of the wiki. Alternatively, by clicking on a feed item a separate movable preview window can be displayed. In another embodiment if an update is made to a wiki, a separate alert window can be displayed, with a link to the wiki. This alert may be posted to each user associated with the wiki, or only those who have chosen to receive update alerts.

Recommendation comments and accompanying feed item can be saved to a recommendation wiki with the content and contents saved within the wiki file or the comments and link to the contents saved within the wiki file. Recommendation comments may also appear in an alert window and can include a link to the recommended feed item.

Figure 13A:
FIG. 13a-c illustrates schematic diagrams of embodiments of web-based windows of the present invention.
Figure 13B:
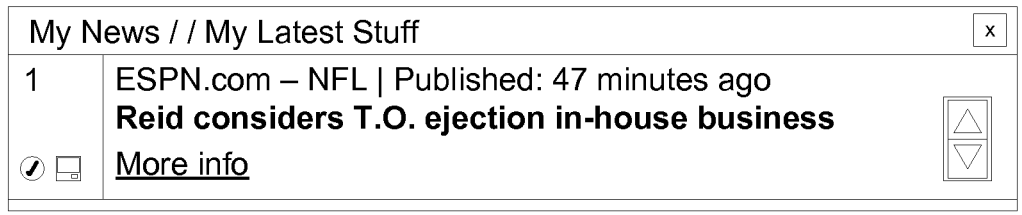
Figure 13C:
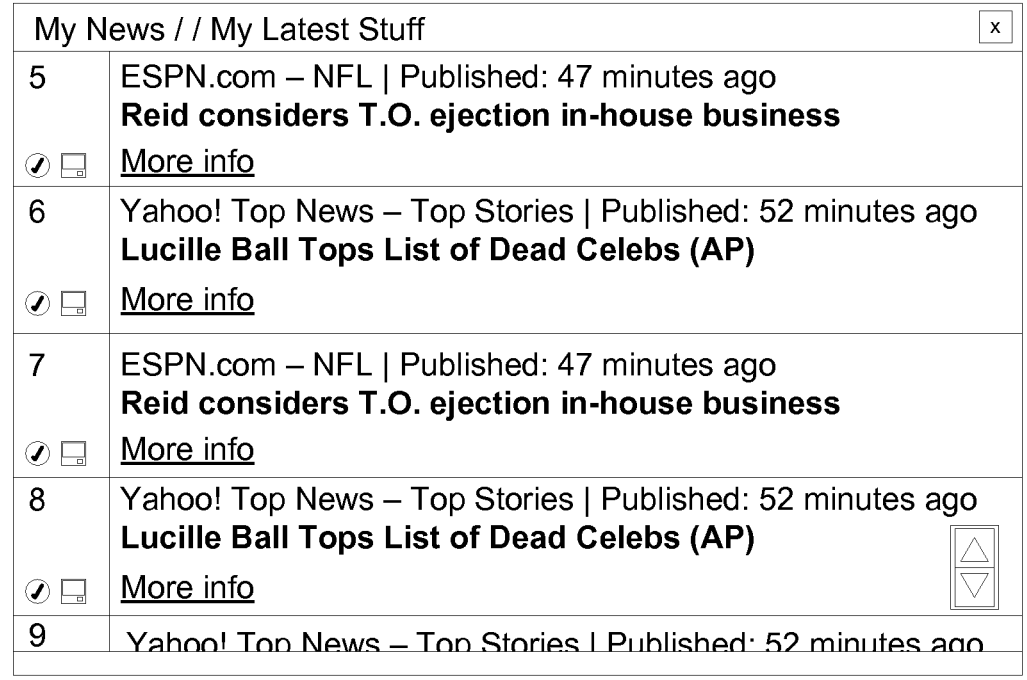

FIG. 13a-c illustrates schematic diagrams of embodiments of web-based windows 1300a-c. Web-based window 1300a may include header 1302, which may include a minimize or close control 1304 operable to close or minimize the window. Web-based window 1300a may be moved, for example, by clicking and dragging on header 1302. Web-based window may include a footer 1306, which may include a reshape control 1308 operable to resize and reshape window 1300a. A web-based window may include a scroll control 1310 operable to scroll the contents of the window. Alternatively, a conventional scroll bar may be included on the window. As another alternative, the contents of the window may scroll in response to mouse position within the window. For example, as the mouse approaches the bottom of the viewable portion, or approaches footer 1306, the contents may scroll upward. Similarly it may scroll upward as header 1302 is approached.

FIG. 13b illustrates an embodiment of a resized version 13a, here shown as a single item window. The window may be resized based on resize input, for example clicking and dragging the mouse up or down while the mouse is positioned over the bottom of the window. FIG. 13c illustrates a resized version of 13a or 13c. In this embodiment, the contents displayed include a half-displayed element. In one embodiment, the window size may automatically snap to the closest window size. Resizing a feed reader may result in a different number of feed items being displayed than prior to the resize input. A scroll number may be determined based on the number of items fully displayed. In one embodiment, the scroll element is operable to scroll the number of items fully displayed within web-based window 1300c.

Figure 14:
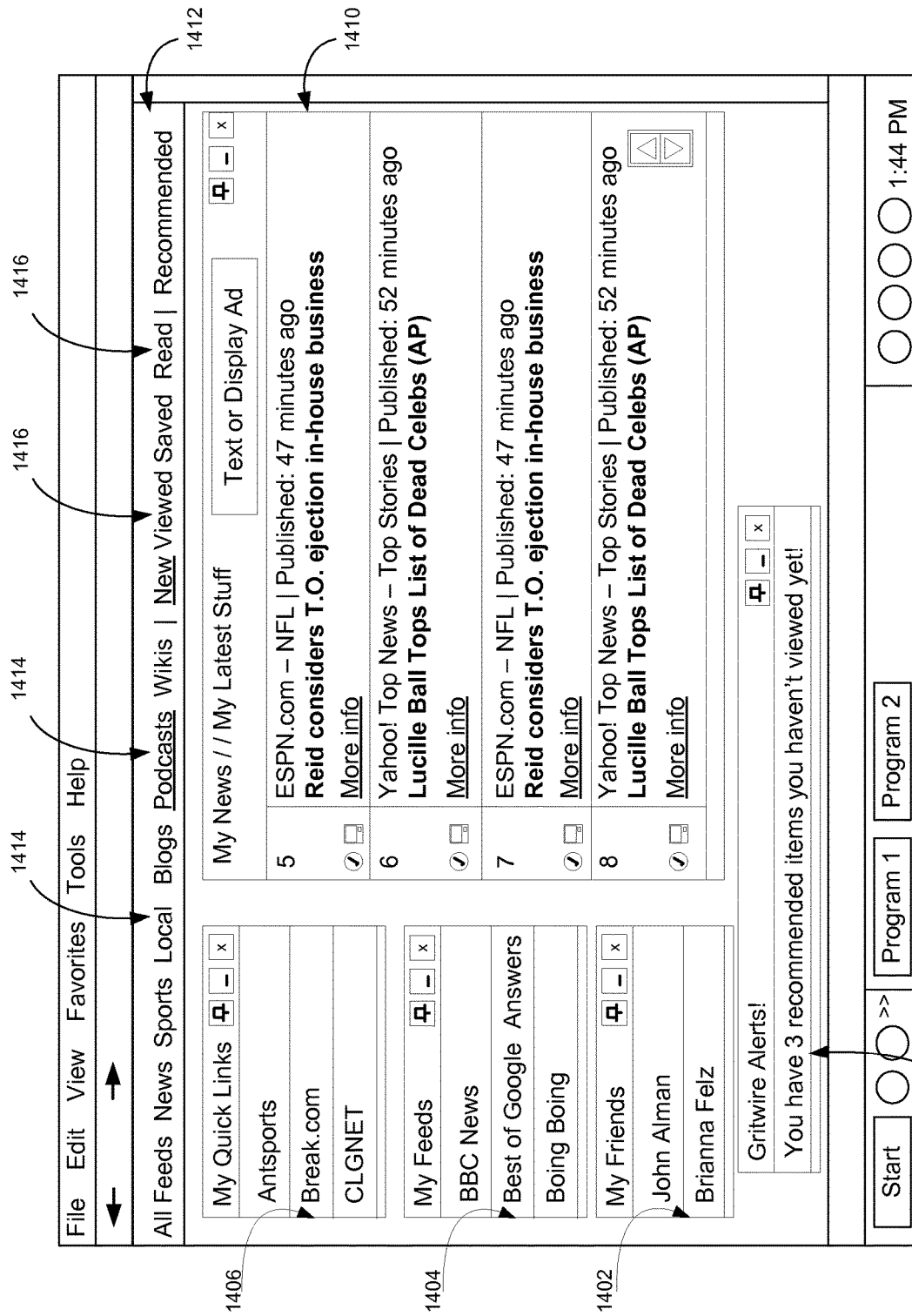
FIG. 14 illustrates a schematic diagram of one embodiment of a browser employing a web-based window system of the present invention.

FIG. 14 illustrates a schematic diagram of one embodiment of a browser employing a web-based window system at 1400. In one embodiment, the web-based window system may include a contact window 1402, a feeds window 1404, a bookmarks window 1406, an alerts window 1408, a main viewer window 1410, a navigation bar 1412, feedbucket navigation elements 1414, and item state navigation elements 1416.

In one embodiment, contacts window 1402 may display a user's contacts within a social network. Groups may also be displayed. Selecting a contact may display information associated with the contact.

In one embodiment, feeds window 1404 may display a user's subscribed feeds. In one embodiment, a selected feedbucket navigation element 1414 may affect feeds window 1404, for example by displaying only feeds within the selected feedbucket. A feedbucket may represent a folder that contains feeds or folders and feeds in a hierarchical directory structure. Alternatively, a feedbucket may represent a set of tagged feeds. In another embodiment, a feedbucket may represent some other aggregated and/or filtered set of feeds or feed items.

In one embodiment, quicklinks, or bookmarks window 1406 may display a user's bookmarks. Selecting a bookmark may cause the browser window to navigate to the selected bookmark or a new window to open to the selected bookmark.

In one embodiment, alerts window 1408 may display alerts to a user. For example, alerts may include received recommendations, social network birthday reminders, wiki updates, or the like. In one embodiment, an alert window may appear only if an alert is associated with the user.

In one embodiment, items within a web-based window may be dragged between windows, or onto other elements of the system. For example, a feed may be dragged onto a feedbucket navigation element 1414. In one embodiment, this may cause the feed to be added to the feedbucket. By way of another example, a feed item from main viewer window 1410 may be dragged onto a contact in contacts window 1402. In one embodiment, this may recommend the item to the contact. Alternatively, a user may also drag the feed item to their saved items, or to another feed under the user's control.

In one embodiment the feedbucket navigation elements 1414 could be in the border of the movable feed viewer widget. In one embodiment, pressing a launch button in a border of the viewer could launch a separate browser with the feed viewer widget. The browser would capture the current height and width setting of the viewer, or alternatively set it to a standard height and width.

In one embodiment there can be an interface element that would allow a feed directory to be called up. In one embodiment, if called up in the launched browser the directory would pop in front and go away once a directory selection is made. In another embodiment, the directory viewer can be launched as a separate movable viewer and positioned next to the feed item viewer. A quicklinks list could also be launched in a separate viewer. An alert window could also be launched as a separate window from buttons on the border of the feed item viewer, or alternatively the alert window can be launched responsive to a recommended item or updated wiki. In one embodiment, the alert window can pop up in the launched viewer window. A feed directory could also be launched from a button on the window so new feeds could be selected or subscribed to for viewing in the feed viewer widget. An interface element, for example a button, could close all open windows.

Figure 15:
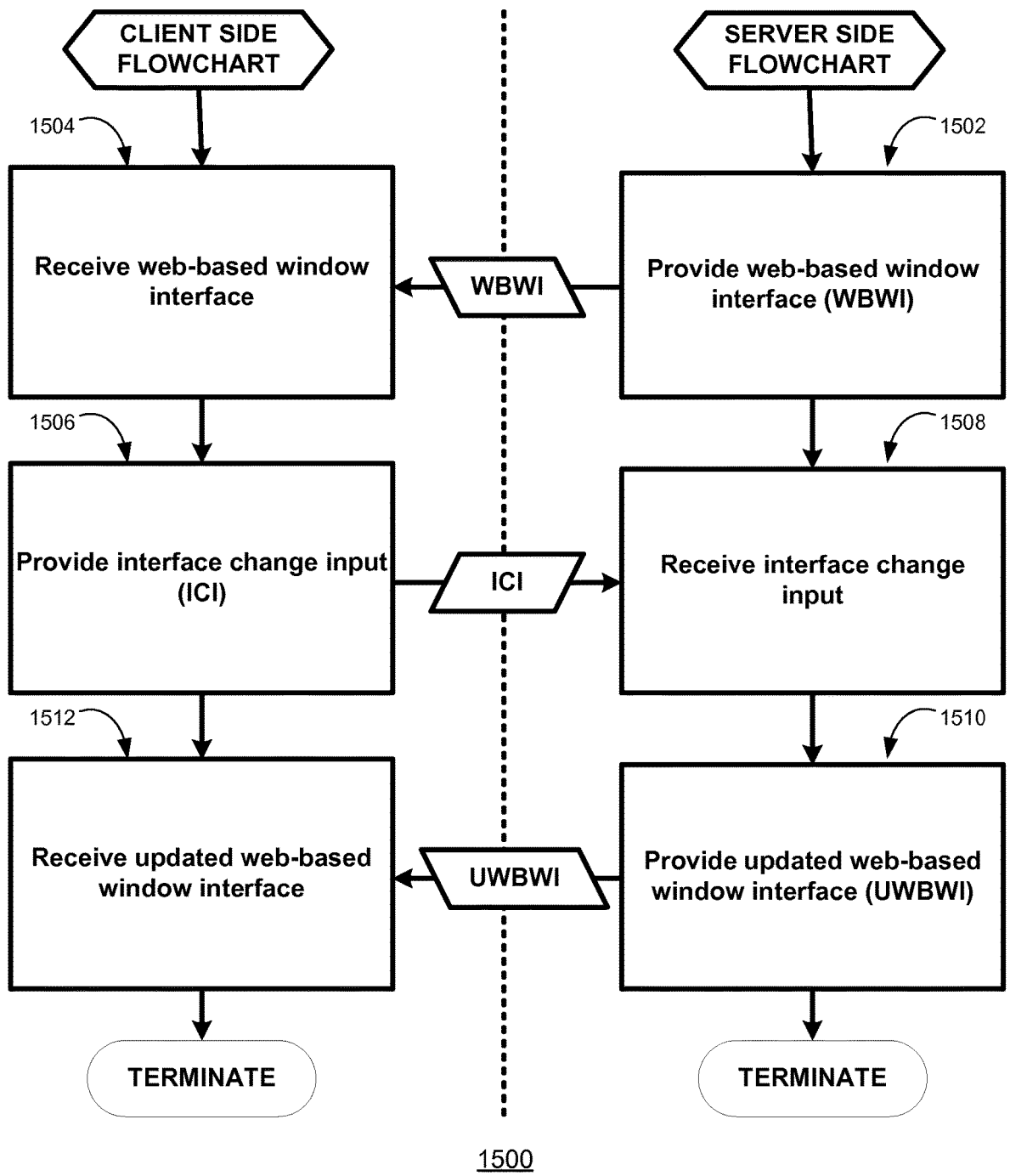
FIG. 15 illustrates a flowchart representative of one embodiment of a method for updating a web-based window system.

The web-based window system may allow users to rearrange, resize, open and close web-based windows, providing a customized environment. FIG. 15 illustrates a flowchart of one embodiment of a process for updating a web-based window system at 1500. The server side provides a web-based window interface at 1502. The client side receives the web-based window interface at 1504. The client side provides interface change input at 1506. The server side receives the interface change input 1508. At a time subsequent to receiving the interface change input at 1506, the server side provides an updated web-based window interface at 1510. The client side receives the updated web-based window interface at 1512. For example, each web-based window served to the user may include information regarding its position on the browser, it's open or closed state, its size, and/or other configuration information. When a user changes an aspect of the configuration, an update on the information may be transmitted to the server and stored in association with the user.

Figure 16:
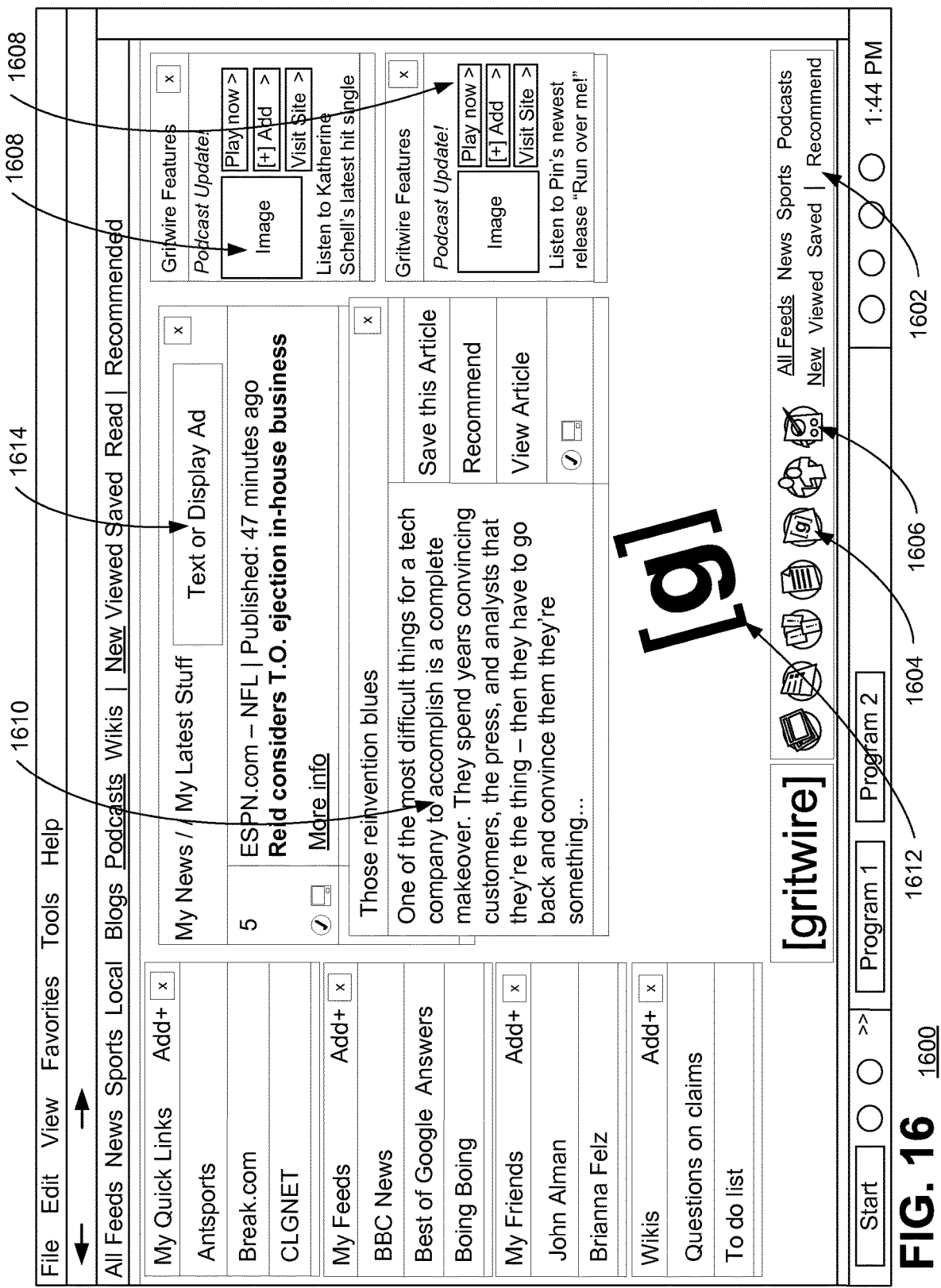
FIG. 16 illustrates a schematic diagram of one embodiment of a browser employing a web-based window system of the present invention.

FIG. 16 illustrates a schematic diagram of one embodiment of a browser employing a web-based window system at 1600. The system may include a system dock 1602. System dock 1602 may include interface controls such as main viewer control 1604, and streaming media player control 1606. Main viewer control 1604 may, for example, open, close, and/or bring main viewer window 1410 above other windows. Streaming media player control 1606 may, for example, open, close, and/or bring streaming media player 10002 above other windows. Alternatively, streaming media player control 1606 may launch a separate browser window with streaming media player 500*a*-*b*. Controls on system dock 1602 may be displayed differently based upon such information as whether their associated web-based window is open, closed, active, hidden, and/or whether new information is awaiting display, or the like.

The system may include one or more featured content windows 1608. In one embodiment, web-based windows may be provided that do not allow moving, resizing, or closing, or some combination of those. For example, a featured content window may be provided that the user is not allowed to close. Featured content window may display standard display or text advertising, recommended feed formatted content, or the like.

The system may include a movable preview window 1610. For example, a feed item or wiki in main viewer window 1604 may be clicked to display preview window 1610. Alternatively, a link or button may be provided associated with the feed item to launch the preview window 1610. In one embodiment, clicking on a second item or control associated with the item may launch a second preview window 1610. Alternatively, there may be a limit to the number of preview windows displayed, the preview window may display content associated with the second item based on a user input. In one embodiment, the preview window may display options such as save, recommend, share, view, rating, or the like that when selected trigger the appropriate action associated with the item. For example, a user may select to preview a feed item. The preview window displays including an option to rate and an option to save. The user may select to rate the feed item using the rate option, this may trigger a signal to a server to store the rating associated with the feed item. The user may select the save option, this may trigger a signal to the server to store a save association between the user and the feed item. A preview window may contain text, HTML, multimedia, or the like.

In one embodiment, the web based windows can include a lock button positioned somewhere, for example, a border region of the viewer. For example, adjacent the lower right corner there may be an input element that would allow the window to be locked at a set height and width. Alternatively, a window may expand or contract automatically based on the loaded contents. For example, a feed viewer widget may display a feed with four items, then when a feed with ten items is loaded the feed viewer widget may expand to support the larger number. Alternatively, one or more preference memory buttons could be positioned in the viewer border region to allow a user to go back to a preferred length and width viewer setting. When locked, the viewer can be unlocked as soon as a user clicks on the expand arrow to resize the viewer.

In one embodiment, web-based windows may house remotely hosted web-based applications. For example, remote HTML, flash, java or the like may be displayed within the web-based window frame. A user may be provided with the opportunity to add such a web-based window by specifying the remote location or by selecting it from a list of known locations. In one embodiment, the web-based window may provide the application it holds with access to certain information, for example IAP information. For example, a web-based window may be provided limited or complete access to feed formatted content associated with the user or with the IAP system. In this manner an API may be provided for developers to create new web-based window functionality for use within the system without requiring access to the system server. Alternatively, applications may be uploaded to the system server.

In one embodiment, a personal podcast server system may be incorporated with the web-based window system to allow users access to their multimedia files. In one embodiment, additional files may be accessible to the file server and their file locations provided. Web-based windows may interact with the file location information to provide a familiar desktop paradigm, but on a webtop, or web-based desktop manner. A web-based window may, in one embodiment, display shared folders. Selecting a shared folder may display that folder's contents. Selecting a file within the web-based window may provide a download option for the file, or attempt to open the file within the browser. In one embodiment, if one or more files are selected, the file server may zip or otherwise compress, and/or encrypt files before transmission.

Figure 17:
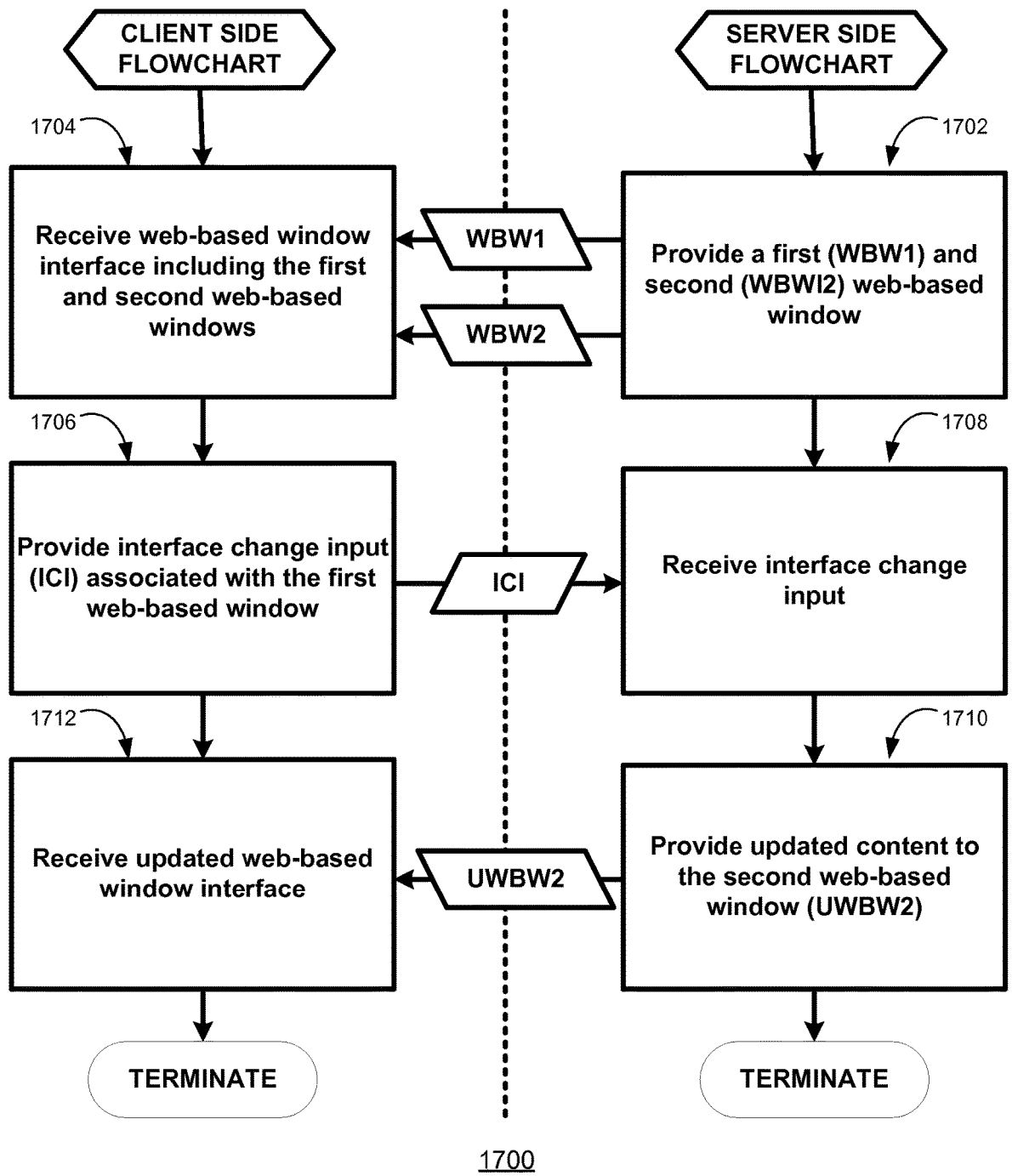
FIG. 17 illustrates a flowchart representative of one embodiment of a method for updating a web-based window system.

In one embodiment, web-based windows may communicate between each other. A selection within one may affect the display of another. FIG. 17 illustrates a flowchart of one embodiment of a process for updating a web-based window system at 1700. A server provides a first and second web-based window at 1702. A client receives a web-based window interface including the first and second web-based windows at 1704. The client provides interface change input associated with the first web-based window at 1706. The server receives the interface change input at 1708. The server provides updated content to the second web-based window at 1710. The client receives an updated web-based window interface at 1712. For example, clicking on a feed entry in feed window 1404 may cause items within that feed to be displayed within main viewer window 1410. In one embodiment, clicking on a feed entry in feed window 1404 may provide the interface change input that updates the main viewer window 1404. Alternatively, clicking on a feed entry in feed window 1404 may trigger the main viewer window 1410 to provide the interface change input to the server. Navigation bar 1412 may also communicate with the web-based windows. For example, clicking on a feedbucket navigation element 1414 may cause the main viewer window 1410 to display items within the selected feedbucket. Likewise, selection of an item state navigation element 1416 may cause only items of a particular item state to be displayed in main viewer window 1410, such as new, viewed, saved, read, or recommended. In one embodiment, the second viewer may be populated based on a rating. The rating may be based on a user selection, a profile characteristic response database, or the like.

Figure 18:
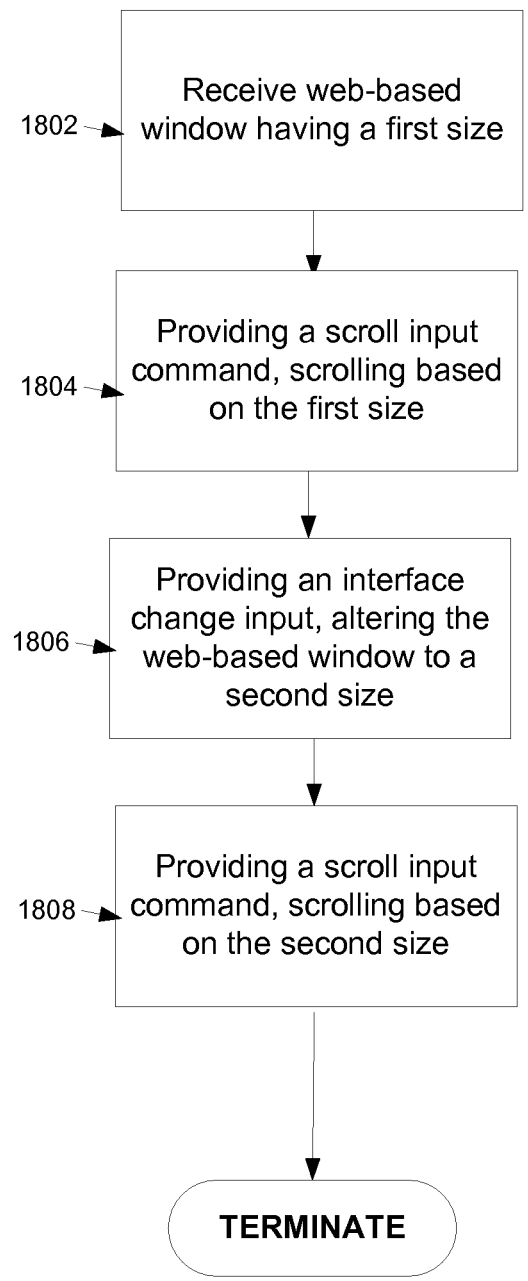
FIG. 18 illustrates a flowchart representative of one embodiment of a method for providing feed formatted content.

FIG. 18 illustrates a flowchart of one embodiment of a process for providing feed formatted content at 1800. A user receives a web-based window having a first size at 1802. The web-based window displays a certain number of feed items based on the first size. The user provides a scroll input command, and a scroll of the feed items is executed based on the first size at 1804. The user provides an interface change input at 1806, this input altering the size of the web-based window to a second size. The web-based window may display a different number of feed items based on the second size. The user provides a scroll input command at 1808, a scroll of the feed items is executed based on the second size 1810. For example, main viewer window may display eight feed items when first displayed to the user. A selection on the scroll control may trigger a scroll of eight feed items. The user may resize the main viewer window to display two feed items. A subsequent selection on the scroll control may trigger a scroll of two feed items.

An embodiment of the webtop, web-based window system may be developed in languages such as flash or java, and much or all may be developed using AJAX. One embodiment of much of the discussed functionality is provided in Appendix 4, but this is only exemplary and should not be viewed as limiting.

In one embodiment, a webtop such as that displayed at 1600 may include a logo or sponsorship as a background 1612. The sponsorship may, for example, display a company logo such as that of McDonald's®. In one embodiment, the webtop sponsorship may be based upon user profile information, characteristic profile response data, geographic region identity, other demographics, or the like. In one embodiment, webtop sponsorship, or other sponsorship or featured content may be excluded from a user's interface based on a payment received from the user. For example, a user may pay a monthly fee in order not to receive featured content and to have the ability to select a webtop background.

Sponsorship or advertising may also be text of display ad on the webtop. For example, it may be presented on a feed reader window such as that displayed at 1614. In one embodiment, a scroll request at scroll control 1310 may change or update the displayed sponsorship. Sponsorship may be determined based on the displayed feed items, a determined geographic region identity, determined demographics, time of day, or the like. In one embodiment, the description or preview of a feed item may also include a sponsorship. Additionally, a browser window may be framed when a destination link associated with a feed item is selected. The framing may include a sponsorship. One or more of these sponsorships may be coordinated to be the same or different. Sponsors may be selected on feed formatted content category, keyword, or topic. For example, a sponsor can select a specific subject mater within a topic such as the St. Louis Cardinals within sports. Title and description may be scanned or indexed to determine such targeting.

One embodiment of the present invention provides a multi-threaded feed processing daemon. A database of feeds is maintained. This database may be located at a server, distributed out among multiple servers or client computers, or some combination of these methods. A first thread manages collecting and selecting feeds to process from the database of feeds. For example, the thread may select those feeds that are marked in the database as stale.

Staleness of feeds may be based upon a variety of factors. For example, some feeds may include a time to live value that indicates the frequency at which they should be updated. This time to live value may be included to calculate staleness. Some feeds or feed sources publish a policy, either in the feed or on a web site, of the greatest frequency at which that feed source may be accessed. This also may be used to calculate staleness. In one embodiment, the frequency at which new items are published within the feed may be used to calculate staleness. For example, feeds may begin by being set to stale after thirty minutes. If, when the feed is requested after the half hour, new items have been published, the time to mark stale may be decreased, for example, to twenty-five minutes. Alternatively, if no items have been published, the time to mark stale may be increased to, for example, forty-five minutes. In one embodiment, the time to mark stale is based upon a historical window of feed updates. For example, if a feed has had fourteen new items published over a one-week period, the time to mark stale may be set to twelve hours. In one embodiment, the frequency of recent posts may be weighted more heavily than in the past. For example, if a feed has been updated three times in the last six days, but two updates have been made in the past hour, the time to mark stale may be lower than the average staleness time of two days.

A second thread may be used to request the feeds from their external source. In one embodiment, a sleep time between web requests may be included within this thread. This may be required in order to successfully process multiple requests from a remote server as a burst of requests may be viewed as a denial of service attack, the remote server may not be able to handle the load, or for other various reasons. In one embodiment, the thread may sleep between requests to the same domain, but continue processing requests for other domains. In one embodiment, the results of the remote feed requests may be stored in an array, for example an array of strings.

A third thread may be used to process the results collected by the second thread. This thread may be responsible for inserting the feed into a database. For example, a result of a web request made by the second thread may be parsed, formatted, cleansed or the like before being inserted into the database.

One embodiment of the present invention provides multiple statuses of feed items. A user subscribed to a feed may have a variety of filters they may wish to apply to feed items within a feed to which they are subscribed. The user may also wish to view counts based on various filters. For example, a user may wish to see or know the number of items that they have not yet viewed. A viewed item may be one that has not yet been displayed on the user interface. A second status of feed item may be a viewed status. A viewed item is one that has been displayed on the user interface. A third status of feed item may be a read status. A read item is one that the user has clicked on. Clicking on a feed item may display the description associated with the feed item, launch a link associated with the feed item, it may perform both, or the like. Additional filters that may be applied to feed items are saved, received recommendations, and viewed recommendations.

One embodiment of the present invention provides feed item archiving. Feed items that are no longer in a feed may be stored in a database. In one embodiment, all feed items may be stored one table with a flag indicating current feed items. Alternatively, feed items may be stored in two tables; a current feed items table and an archived feed items table. As the feed daemon processes each feed, it may copy feed items from the current feed item table to the archived feed item table when the feed item is no longer present in the feed.

FIG. 19 illustrates a schematic diagram of one embodiment of a browser employing a web-based window system of the present invention at 1900. The web-based window system, or webtop, may display the windows, or widgets, based on user preferences. A webtop is shown including widgets including alert notification widget 1914, alert widget 1916, and feed reader widget 1902. Other widgets, such as wiki, quicklink, or media player, fewer or no widgets may also be displayed on the webtop.

One embodiment of the present invention provides for maintaining user preferences. One set of user preferences that may be maintained is widget settings. In one embodiment, a user may have an arbitrary number of widgets associated with their user account, and those widgets may have various settings associated with them. Some settings may be common across all widgets, while others may be specific to widget type. For example, each widget may have position information indicating where on the screen it is to be displayed, height information and width information. Similarly each widget may have an open, closed, minimized or maximized status. Some widgets may include visual adjustments to pane position or the like while those settings are unnecessary in other widgets. A widget type may also be considered to be a setting of a widget. In one embodiment, one or more tables may store user preferences. A user preference table may be dedicated to widget settings, or widget settings may be contained in a general user preferences table. If widget settings are stored in a general user preferences table, the table may include a column indicating the type of user preference, for example a type might be widget settings. In one embodiment, when a user requests to view the webtop, user preferences associated with their account are selected. As the webtop processes through the user preferences, if a user preference represents a widget, a new widget is instantiated and given the settings associated with the user preference.

For example, a user setting may indicate that a widget is a feed reader widget that is currently maximized, when unmaximized should have a placement fifty pixels from the left side of the screen and twenty pixels from the top of the screen, when unmaximized should have a width of seven hundred pixels and a height of four hundred pixels. Further, feed reader 1902 is shown including a three-pane layout. Feed list divider 1908 separates the feed list from the feed viewing. Preview pane divider 1910 separates the feed items from the feed item preview, or description. User preferences may include the specifications that the feed list divider should be one hundred fifty pixels from the left border of the widget, and the preview pane divider should be two hundred pixels from the top of the widget.

In one embodiment, the webtop may be configured for an individual user based on one or more feed formatted configuration files. For example, a single XML file may include user profile information, widget size and location, and the like. The same file, or a different file may then provide a list of subscribed feeds to populate the user's feed viewer. Similar requests may be made or the data included in a single file for quicklinks, wikis, and the like.

In one embodiment, a feed system may include a variety of recommendation methods. For example, a concierge user may send feed or feed item recommendations. A concierge user may be an actual user, or an automated user, or a combination of the two. For example, an automated process may make the recommendations, but messaging responses to the user from other end users may be managed by one or more individuals. The concierge user may be connected to the user through a social network. In one embodiment, the user does not have the option whether to accept the concierge user as a friend in the social network. The user may also not be able to remove the concierge user as a friend. Alternatively, the concierge user may maintain the standard rules of friendship in a social network. For example a friendship request may be required, as well as an acceptance. The user may also remove the friendship with the concierge user.

Another method of recommending feeds or feed items is to send a system alert. An alert may be sent to a user without a recommending user.

Again referencing FIG. 19, one embodiment of recommending feed formatted content is displayed. The webtop includes an alert notification 1914. When the user has clicked on the alert notification and an alert 1916 is displayed. Clicking on view link 1918 may launch a new browser window containing the linked story 408. Alternatively, clicking the view link may display the feed information 1920 in the feed reader 1902. Clicking on the feed information displays a preview, for example a description or a linked page, in the preview panel.

Another method of recommending feeds includes providing a semi-subscribe status to one or more feeds. A feed to which a user is semi-subscribed may be included in their feed subscription list. The feed may include a visual indicator that it is not currently subscribed to by the user. For example, the feeds 1904 are displayed differently than feeds 1906. The user may interact with the feed as normal, but be given the opportunity to subscribe to the feed or remove it from semi-subscribe status.

In one embodiment, an interface may facilitate the process of filtering aggregated feed formatted content. The filtered content may be displayed on the interface or a filtered feed may be provided for consumption by another service or interface.

For example, a site may aggregate news information from various publications, authors, and biogs. Each of these sources may have a particular bias or slant to the information they publish. An interface option may be provided to filter the news based on one or more of these biases. For example, a draggable sliding scale may be provided allowing the user to select how central, left, or right-leaning the stories included may be. In one embodiment, a keyword or subject filter may be employed in combination with the bias indicator. Advertising or sponsorship of a website or interface displaying aggregated information based on a bias indicator may be provided in a variety of ways. For example, advertisers may select to target advertisements to users viewing news from a certain bias. A fundraising dinner for the National Rifle Association may, for example, be advertised to users viewing news from a conservative bias. Additionally, the National Rifle Association may select to target based on keywords or subjects associated with handguns. Double confirmation targeting and targeting based on geographic region identity may also be employed in conjunction with targeting based on bias selection.

One embodiment of the present invention includes subscriber affiliation indication. For example, a user may have a profile page or a homepage, such as a profile page on a social network site. That page may include one or more visual queues indicating one or more feed subscriptions held by the associated user. For example, a brand such as AXE® body spray may publish a feed related to the "Order of the Serpentine" marketing campaign. A user that subscribes to that feed may have an Order of the Serpentine insignia displayed on their profile page. In one embodiment, subscriber affiliation indication may be displayed for all feeds a user is subscribed to. Alternatively, the user may select which affiliations they wish to display. The visual queue indicating subscription may be an image from a link indicated in the feed, or the site hosting the profile page may store associations between feeds and visual queues. The site may charge the feed publisher to include the subscriber affiliation indication. In one embodiment, the queue may be audio or video as opposed to a static visual.

In one embodiment, the prioritization of feed item delivery via the one or more methods of communication maintained by the IAP may be based on a user's subscription settings, time relevancy of the feed item, recommendations, and social network database 2560. Recommendations may be weighted based upon closeness of relationship, a user's reaction to prior recommendations from the same source, as well as whether it was a direct recommendation to the user, a recommendation to friends, or a general recommendation. Feed item prioritization may also be based on a frequency factor. A frequency factor is the frequency items are posted at the feed source. Feed items may also be prioritized based on the recentness they were posted, as well as the quality of the feed source. The quality of the feed source may be based on the number of subscribers to a feed, the age of the feed or site publishing the feed, a third party ranking of the site, such as the Google or Alexa rank of the site publishing the feed.

In one embodiment, each of the feeds in a viewer may include a rating selector, for example zero through five stars. A user may rate each feed, or only certain feeds, for example those they are subscribed to. Pre-populated, or semi-subscribed feeds may be pre-rated based on characteristic profile feed response data or other data. Once a user begins interacting with the feeds the ratings may be adjusted based on their feed response data.

In one embodiment, feed item prioritization may be based on a weighted user rating. Many factors may be used individually or combined to create a weighted user rating. For example, the number of subscribers to a user recommendation feed may be one factor. Another factor for creating a weighted user rating may include a ratio between the number of feed items viewed and/or read and the number that the user chooses to recommend. For example, a user who has read one hundred feed items and recommended eight may be weighted lower than a user who has read one hundred feed items and only recommended two.

In one embodiment, the IAP may include one or more public or semi-public data feeds presenting individual user or aggregate user relevance information. For example, a feed may be available for each user including the feed items read by that user. Another feed may include some or all of the items rated by the users. Using the IAP interface, a user may mark a feed item as recommended. The feed associated with that user's recommendations then makes that recommendation immediately available for posting on any other site or service pulling from that feed. By simply reading and rating news in a reader, multiple presentation points on a variety of network nodes may be affected.

Aggregate relevance information may be presented in one or more feeds as well. For example, a relevance data feed may be available for each external feed aggregated by the system. The relevance data feed may only publish feed items from the original external feed that meet certain threshold requirements. Alternatively, the feed items may include relevance measurement information such as the number of people who have recommended or rated each feed item, the number of views and reads, or the like.

In one embodiment, such feeds may require a username, or username and password to receive access. The username or username and password combination may be included in the feed URL, or may be included in an HTTP post requesting the feed. Usernames and or passwords required to access these data feeds may be standard IAP usernames, they may be some other username or identifier associated with the IAP user account, or there may be separate usernames or identifiers exclusively created for accessing such feeds. For example, developer accounts may be created with identifiers associated with such accounts that are included in the feed requests.

One embodiment of the present invention includes a feed display badge. Feed display badges are provided for easy and aesthetic display of feed formatted content. Feed display badges may be incorporated into web pages by adding HTML code referencing the location of the badge. Such pages may include biogs, social network profiles, or other web sites. In alternative embodiments, badges may be included in desktop interfaces or applications, or may be included in other display environments such as, for example, cell phones or PDAs.

A feed display badge may be designed in Flash, javascript, java, or some other language that includes the ability to request a feed and reformat it for presentational purposes. A feed display badge, or badge, may include one or more feed URLs hardcoded within the badge. Alternatively, the HTML, javascript, or other badge inclusion code may include one or more feed URLs. As another alternative, the badge may be associated with a user account or the badge inclusion code may include reference to a user account. An interface may be provided allowing the user to specify the one or more feeds to be included in the badge display.

Other editorial or aggregation techniques may be used to determine what information is displayed in a badge. For example, a feed reader may include one or more feeds of information regarding a user's feed reading interactions. Feeds may be available for all items viewed, read, or rated in some manner. A badge may be configurable to display one or more of these. A badge may display any of the feed formatted content and incorporate many of the sponsorship methods described.

In one embodiment, the feed formatted content displayed within a badge may vary based upon the user viewing the badge. For example, a cookie may indicate that a user viewing a badge is also a user of a feed reader used to generate the items displayed in the badge. The badge or feed formatted content selected from the feed reader may be filtered or displayed differently based upon the reading interactions of the viewing user. A feed item that has been read by the viewing user may be omitted or visually indicated in some manner.

The visual display of a badge may be configurable. For example, badge inclusion code may specify background color, font color, shading, highlighting, optional or required text elements, images or multimedia files to be included in the display, or the like. In one embodiment, limited configuration options may be provided on a free badge. The free badge may include one or more advertisements, sponsorships, or links indicating where to get such a badge. A paid version may exclude one or more of these and include additional configuration options.

One example of potential badge providers or redistributors is political campaigns. A political campaign may provide a badge displaying one or more photos of the candidate. The photo may be static, or the photos may be drawn from feed formatted content such as a feed from the online service Flickr. The badge may also include feed formatted content from the candidate's blog. The badge may additionally or alternatively include news items related to the campaign. A badge provision service may allow the campaign to configure the display of the badge and select the feed formatted content to be provided. The badge provision service would then provide redistribution code to the campaign allowing the campaign to promote the badge, for example on their campaign website. A supporter may then include the badge on his or her own blog, desktop, or the like.

Badges may be provided by original content providers, content aggregators, an IAP, an advertiser, a personal podcast server service provider, or any other party that provides or collects feed formatted content. For example, a badge may be provided to display what music a user has been listening to on an online service or on a desktop media player that reports or records listening information that is accessible as feed formatted content.

In one embodiment, badges may be provided to facilitate cooperative purchasing. A user of a cooperative purchase system may select a badge that displays all available contingent purchase opportunities, purchase opportunities with upcoming deadlines or thresholds, or purchase opportunities the user is participating in. The badge may reflect the opportunities, status associated with the opportunities, or the like.

One embodiment of the present invention includes a question and answer management system and the publishing of one or more feeds associated with the system. A database is maintained that minimally includes questions and answers. Two types of users access the system, search users and expert users. The same user may be both a search user and an expert user.

A search user is presented with the ability to search the database of questions and answers, for example using a standard search text box and submit button. Returned results, if they exist, are displayed to the search user. Based on the results, the search user determines if their question or search has been satisfied. If the search user determines that the results are not to their satisfaction, they may submit a question to the database. In one embodiment, they may include an email address or some other form of contact information in order to receive an alert when their question is answered. Alternatively, the service may provide a feed that will publish the answer to their question when it is entered. In one embodiment, one or more administrative users may review submitted questions to determine those that will be answered.

An expert user has the ability to submit answers to the system associated with received questions. Access to an answer submission interface may require a password or some other type of authentication. Alternatively, any user may submit answers. Feeds of new questions may be published; in one embodiment multiple feeds may be published based on an associated question subject. An expert user may subscribe to the new question feed, to a subject based new question feed, or may create a custom feed based on one or more keywords or keyword and subject. In one embodiment, an administrative user may review answers prior to publication within the system.

One or more feeds of recently published answers may be made available. The feeds may again be associated with a question subject, or may be filtered based on keywords. In one embodiment, the database may also include a keyword field associated with the questions and answers. The keyword field allows search or expert users the opportunity to enter associated or synonymous words to increase the likelihood of a search match.

A variety of additions or modifications may be made to the search and expert system. For example, a question may have more than one answer associated with it. The service provider may additionally provide a badge that displays information from one or more of the feeds published by the system. Returning to the political campaign example, the campaign site may include an "ask the candidate" section where constituents may ask question on policy, personality, or the like. The candidate or a representative may act as the expert user and reply to submitted inquiries. By supplying a badge for supporters to post on biogs and other sites, the entries into the search and expert system may reach a greater audience.

The search and expert system may be hosted with a content provider or may be provided in an ASP model. The same central question and answer database may be accessed over multiple sites.

One embodiment of the present invention includes a method of marketing multimedia. First, at least one expert in a social network is determined. This determination may be based upon statistics collected relating to the way users interact with available feeds, multimedia, products, or the like presented via the social network or elsewhere. The expert may be determined based on the speed at which they identify items that will eventually become popular. The determination may also be based on the accuracy with which their tastes have matched what become popular. In one embodiment, a multimedia list with ranking options may be provided to the expert. A ranking input associated with multimedia programs is received from the expert. At least one disseminator associated with the expert is determined. A disseminator may be a user in a social network with above a certain threshold number of relationships, or some other indication of broad influence. The association between the expert and disseminator may be, for example, a relationship in the social network. Multimedia programs are provided to the disseminator based on the expert ranking input, the provision may include notice of the expert's identity and or ranking. The multimedia program may be provided or displayed in a disseminator profile in the social network. Play requests may be received from at least one viewer of the disseminator profile, and a predetermined portion of the multimedia program may be played responsive to the requests. Determining an expert in a social network may be based upon whether a user of the social network is subscribed to at least a portion of a predetermined list of feeds. Determining at least one expert in a social network may be based upon whether the user fits a predetermined expert profile based on survey information. Determining a disseminator associated with the maven may be based upon finding a user who is associated as a friend of the expert in the social network. A full version purchase option may be provided associated with the displayed multimedia, or responsive to the received play request.

One embodiment of the present invention includes a method of marketing multimedia. At least one expert associated with a class of multimedia is determined. A multimedia program with ranking options is provided to the expert. Ranking input associated with the multimedia program is received from the expert. At least one disseminator profile in at least one social network is associated with the expert ranking and multimedia program. Play requests are received from at least one viewer of the disseminator profile, and a predetermined portion of the multimedia program is played responsive to the requests. A full version purchase option may be provided associated with the displayed multimedia, or responsive to the received play request.

One embodiment of the present invention provides a method of sharing user-associated information online. A user profile is provided. Files on the user's computer are indexed to the user profile. An access request is received from a second user. One ore more links associated with the files on the user's computer are displayed at a profile interface. A file request is received based on one or more of the displayed links. At least a portion of a user file is provided based on the file request. For example, a user may run a personal podcast server on their home computer that selectively shares their music collection. The personal podcast may be associated with a user profile on a web site. A second user may view the first user's profile at the web site. One portion of the user profile may include links to the songs shared on the personal podcast. When the second user clicks on a link, at least a portion of the song file may be provided. For example, a music player may be opened, and a twenty second clip of the song provided. Files may be audio, video, text or any other file type. In one embodiment, a file may have a portion specified as the portion to be provided in response to file requests. This specified portion may be a segment selected from within the file, or may be added to the file.

One embodiment of the present invention provides a method of sharing user-associated information online. A user profile is provided. User-associated information is indexed to the user profile. An access request is received from a second user. One or more links to the user-associated information is displayed at a profile interface. An information copy request is received based on one of the displayed link. At least a portion of the user information is indexed to the second user based on the information copy request. For example, user associated information may be a quicklink, feed, folder of feeds, feed category, feed item, or the like. A copy request may copy the user-associated information in the database, or it may link the second user to the first user's information in order to reflect future changes made by that user.

In one embodiment, users may view a list of other users that have the same user-associated information. For example, a user may view a profile that indicates a second user is subscribed to a certain feed. The user may select to then view a list of all people currently subscribed to that certain feed. Similarly, users may be viewed based on songs or videos shared, articles saved, quicklinks, recommendations, or the like.

In one embodiment, a method of online advertising is provided. The method includes providing at least one ad in feed formatted content, wherein the ad is associated with a location multimedia link. The ad can be provided as a feed item within a feed. For example, a bar feed can provide feed items for different bars or for a single bar. A user can then select one of the ads by clicking or other selection method. A request to display the ad is sent from the user communication device, for example, computer, PDA, cell phone, to a control server. The control server can then provide the user with location information to a server associated with the advertisement that may stream multimedia associated with the link directly to the user communication device. For example, a bar may provide a feed with a link which when selected streams a live video feed of the bar. In one embodiment, an advertiser can control functionality of the link. For example, via an advertiser interface, an advertiser can send ad controller input to the control server. Based on the ad controller input the multimedia link can be enabled or disabled. Alternatively, for example, an entity that runs several entertainment establishments, for example, bars, can select from a list via the interface, which bars to link to for the live feed. The ad controller input may also designate user profile characteristics or geographic location or demographic information that would be used to trigger link options. For example, A bar owner with more than one bar can control which bar video is streamed based on the location of the user requesting the ad. In this example, a comparison can be made based on the geographic location determination of the communication device and the bar location. Users requesting the ad would be streamed the video from the bar that is closer to the user's location. The geographic location determination can be made based on IP address translation, GPS, user profile information, signal triangulation, or the like. Alternatively the ad control input could include triggers based on other measurable input, including, amount of sales that are computed for that night, input of the number of patrons in the bar, input from a motion sensor, input determined from scanning frames of the bar video and determining a number of people in the bar, weight sensors on the bar to indicate how many bar dancers are performing, heat sensors, input of the noise level in the bar, like signals, sensors, or inputs, or any combination of these.

In one embodiment, a newspaper or other website could provide listings of classified ads in one or a plurality of viewers. Feed items can be podcast or videocast items that represent a classified ad. The feed item may be clicked on by the user who wants to know more, and the associated video or audio will play. The classified ads may be prioritized base on double confirmation targeting. For example, ads for furniture may be prioritized based on double confirmation geotargeting so that if profile and IP-to-geography information indicate a user lives in Evanston, Ill., classified ads would be feed items targeted to Evanston, Ill. would appear first in a classified ad feed.

In one embodiment, a third party advertiser interface can allow third party advertisers to select streaming feeds for advertisement insertion. For example, a third party advertiser, such as, Miller Brewing Company, can select Joe's Bar feed and for a fee insert advertisements either in the feed by introducing, splicing, or overlaying their own multimedia or text content into the stream, or as the skin for the viewer which is displayed at the requesting user's communication device. In one embodiment, a user can send a recommendation of the feed formatted ad to a friend via a social network. The control server would receive a request to recommend the feed to the friend and index the ad to the friend. The control server can provide the recommendation information to customize the third party ad. In the example above, when the friend, for example Bob, selects the recommended ad that was sent by Jim via the social network, the inserted ad would be customized to say "Hey Bob, Join Jim over at Joe's Bar for an icy cold Miller." An establishment may control a plurality of bars and may send a feed based on the geographic location of the requestor. A general party feed may dynamically select the link to a feed or multimedia stream of the party closest to you.

The feed system may provide as advertiser interface. This interface may allow the advertiser to view the live feeds and insert bar approved ads in the feed. Inserted ads may be displayed based on profile information.

These and other combinations of the methods and systems may also be contemplated by one skilled in the art, and as such are in the spirit of the invention. For example, feed formatted content may be sponsored by determining at least one characteristic profile for the users based on the characteristic input, receiving a response associated with feed formatted content from at least one user having the determined characteristic profile, recording the response associated with the feed formatted content in a characteristic profiled response database associated with the determined characteristic profile, and determining sponsorship of feed formatted content based the profiled response database. The sponsorship may then be determined based on the characteristic profile, or a geographic region identity of the user. Such sponsorship may be displayed on a webtop or a badge.

By way of another example, prioritized feed items may be sponsored by associating a user with a characteristic profile response database, prioritizing feed items within a user feed based on the characteristic profile response database, or in one embodiment, additionally based on a weighted user rating. The feed items may then be sponsored based on providing a sponsorship of the feed items based on the prioritization, receiving response data within the characteristic profile response database, and modifying the database based on the response data. Prioritization of the feed items is modified within the user feed based modified database, and a modified sponsorship of the feed items based on the modified prioritization. The sponsorship of prioritized feeds may be provided in a social network based on relationships therein, it may be displayed in redistributed badges, or displayed on a webtop.

By way of another example, live feeds from bars and other venues may be included in classified ad feeds that are displayed in semi-subscribe state to users of the IAP, and may be redistributed with badges. In one embodiment, the live feed information could be presented in conjunction with a cooperative purchase opportunity to rent out a location or reserve a table.

The present invention may be embodied in other specific forms without departing from its spirit or essential characteristics. The described embodiments are to be considered in all respects only as illustrative and not restrictive.

The invention claimed is:

1. A method of operating a feed reader, the method comprising:
   receiving, at a computing device, a resize input;
   resizing the feed reader from a first display including a first number of feed items to a second display including a second number of feed items based on the resize input, the first number different than the second number;
   receiving, at the computing device, a scroll request;
   determining, at the computing device, a scroll number based on the second number; and
   scrolling based on the determination.

2. The method of claim 1, further comprising determining a sponsorship based on one or more of the feed items within the second display.

3. The method of claim 1, further comprising determining a sponsorship responsive to the scroll request.

4. The method of claim 3, further comprising determining the sponsorship based on a geographic user identity associated with the scroll request.

5. The method of claim 4, further comprising determining the sponsorship based on time of day determination.

* * * * *